(12) United States Patent
Tsuji et al.

(10) Patent No.: US 12,505,935 B1
(45) Date of Patent: Dec. 23, 2025

(54) CONDUCTIVE DISPERSION SOLUTION, RESIN FILM-FORMING COATING MATERIAL, RESIN FILM, MEMBER, AND ELECTROPHOTOGRAPHIC IMAGE FORMING APPARATUS

(71) Applicant: CANON KABUSHIKI KAISHA, Tokyo (JP)

(72) Inventors: Yasutomo Tsuji, Saitama (JP); Yuji Kitano, Kanagawa (JP); Takeshi Suzuki, Kanagawa (JP); Hiroomi Kojima, Kanagawa (JP); Masatsugu Toyonori, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/796,438

(22) Filed: Aug. 7, 2024

(30) Foreign Application Priority Data

Jun. 24, 2024 (JP) .................................. 2024-101323

(51) Int. Cl.
| | |
|---|---|
| *H01B 1/22* | (2006.01) |
| *C09D 5/24* | (2006.01) |
| *C09D 7/61* | (2018.01) |
| *C09D 7/63* | (2018.01) |
| *C09D 133/10* | (2006.01) |
| *G03G 15/16* | (2006.01) |
| *G03G 15/20* | (2006.01) |
| *H01B 1/20* | (2006.01) |

(52) U.S. Cl.
CPC ................ *H01B 1/20* (2013.01); *C09D 5/24* (2013.01); *C09D 7/61* (2018.01); *C09D 7/63* (2018.01); *C09D 133/10* (2013.01); *G03G 15/162* (2013.01); *G03G 2215/1623* (2013.01)

(58) Field of Classification Search
CPC ... H01B 1/20; C09D 7/61; C09D 7/63; C09D 5/24; C09D 133/10; G03G 15/162; G03G 2215/1623

See application file for complete search history.

(56) References Cited

U.S. PATENT DOCUMENTS

| | | | |
|---|---|---|---|
| 6,093,749 A | 7/2000 | Watanabe et al. | |
| 2009/0191404 A1* | 7/2009 | Itai ........................... | C09D 7/62 428/521 |
| 2010/0311859 A1* | 12/2010 | Van De Belt ......... | C09C 1/3684 106/286.2 |
| 2017/0205718 A1* | 7/2017 | Chokan .............. | G03G 5/14747 |
| 2024/0288800 A1* | 8/2024 | Kitano ..................... | C08K 3/22 |

FOREIGN PATENT DOCUMENTS

| | | |
|---|---|---|
| JP | 11-314918 A | 11/1999 |
| JP | 2007-211155 A | 8/2007 |

* cited by examiner

*Primary Examiner* — Haidung D Nguyen
(74) *Attorney, Agent, or Firm* — Venable LLP

(57) ABSTRACT

A conductive dispersion solution comprising a tin oxide particle and a dispersion medium, wherein the conductive dispersion solution further comprises an organic acid, a phosphorus compound, and an amine compound, the tin oxide particle is dispersed in the dispersion medium, a cumulant average particle diameter of the tin oxide particle in the conductive dispersion solution is 90 to 400 nm, the organic acid, the phosphorus compound, and the amine compound are dissolved in the dispersion medium, and the tin oxide particle comprises an antimony-containing tin oxide particle A not treated with a silane coupling agent and an antimony-containing tin oxide particle B treated with a silane coupling agent.

13 Claims, 1 Drawing Sheet

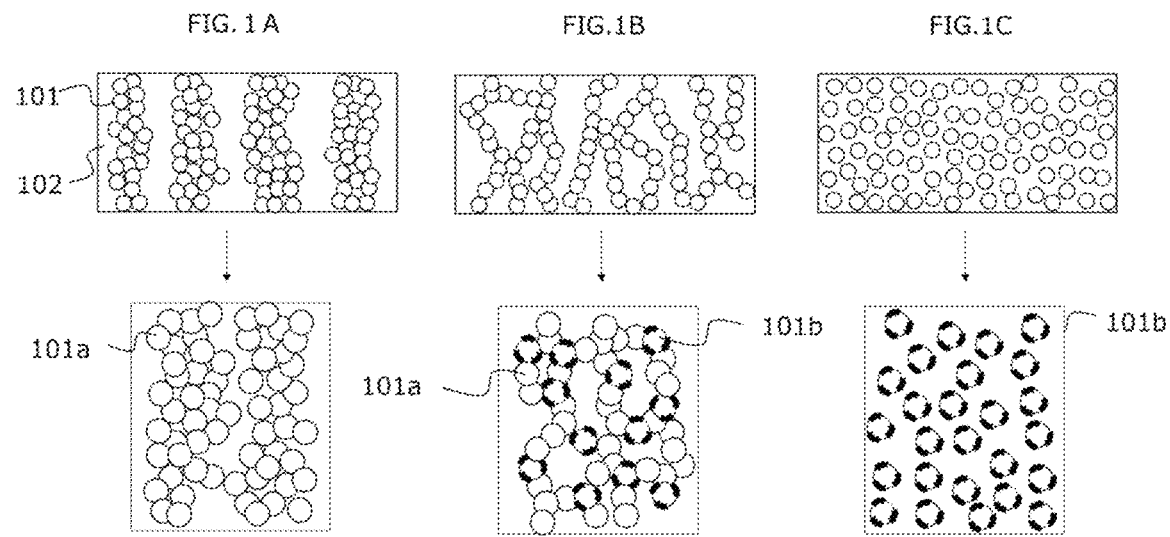
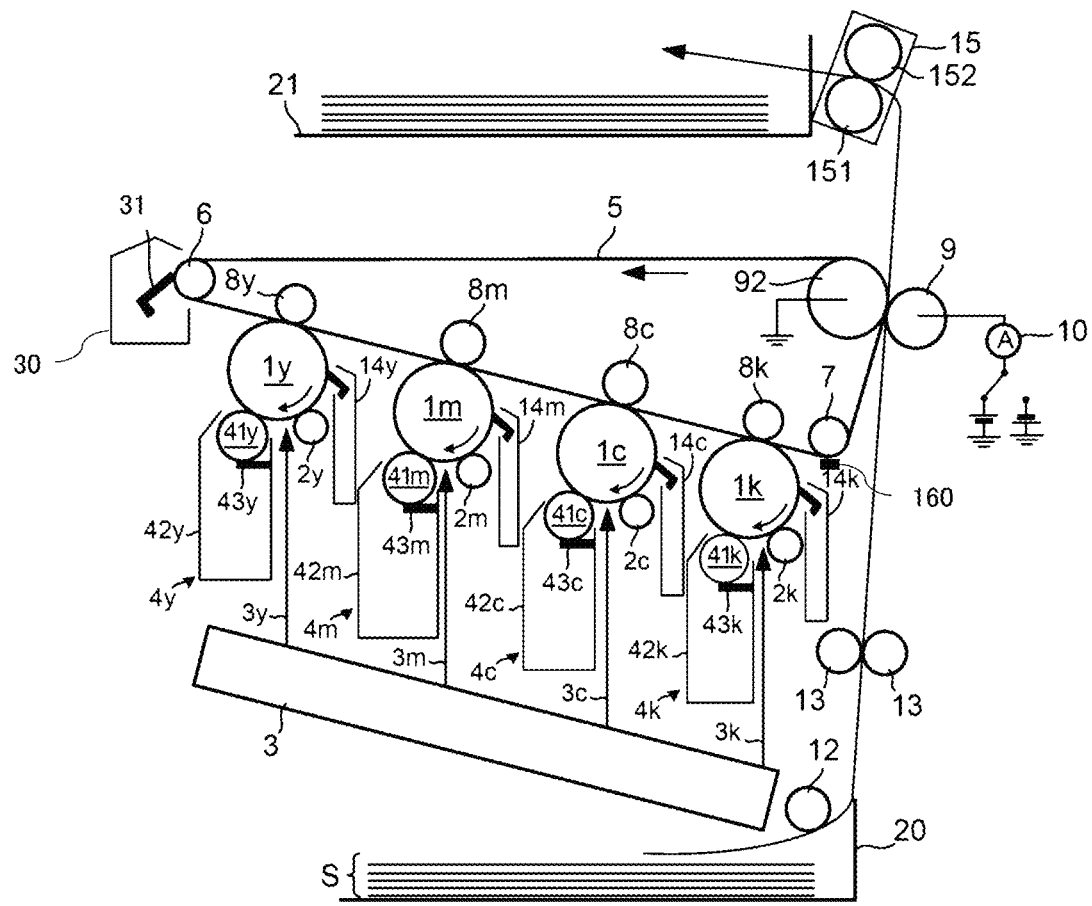
FIG. 2

CONDUCTIVE DISPERSION SOLUTION, RESIN FILM-FORMING COATING MATERIAL, RESIN FILM, MEMBER, AND ELECTROPHOTOGRAPHIC IMAGE FORMING APPARATUS

BACKGROUND OF THE INVENTION

Field of the Invention

The present disclosure relates to a conductive dispersion solution, a resin film-forming coating material, a resin film, a member, and an electrophotographic image forming apparatus.

Description of the Related Art

When a dispersion solution in which antimony-containing tin oxide (hereinafter referred to as ATO) particles, which are transparent to visible light, are dispersed in a dispersion medium is mixed with a binder resin such as an acrylic resin or a urethane resin, it is possible to prepare a coating material having high transparency and excellent conductivity. Therefore, ATO particles are often used in electrical and electronic material applications such as display electrode materials such as liquid crystals and organic EL materials, electrode materials for solar power generation, photosensitive members used in electrophotographic devices, and electrically conducting layers for intermediate transfer belts.

In addition, since ATO particles have a property of absorbing electromagnetic waves such as infrared and ultraviolet rays, when a resin coating material containing ATO particles is formed into a film on a substrate, it is possible to easily produce a transparent resin film that can cut heat rays such as infrared rays. Such coating materials are used in fields in which infrared and ultraviolet blocking properties are required, such as window materials for automobiles, trains, ships, and houses.

Japanese Patent Application Publication No. 2007-211155 proposes a method of forming ATO particles into chain-like particle clusters in a dispersion solution. The document discloses that, by this method, the ATO particles easily form a conductive path even in a coating film, and an ATO dispersion solution that can provide high conductivity is obtained.

On the other hand, Japanese Patent Application Publication No. H11-314918 proposes a surface-modified anhydrous zinc antimonate colloidal particle sol obtained by covering the surface of anhydrous zinc antimonate colloidal particles with a silicon-containing material. The document discloses that, by this method, an organic solvent sol of anhydrous zinc antimonate that is dispersed in a state close to that of primary particles without aggregation is obtained.

SUMMARY OF THE INVENTION

At least one aspect of the present disclosure is to provide a conductive particle dispersion solution that can form a highly conductive film and allows the film to have better surface roughness. In addition, at least one aspect of the present disclosure is to provide a resin film-forming coating material which can form a resin film that has both high conductivity and favorable surface roughness.

In addition, at least one aspect of the present disclosure is to provide a resin film that has both high conductivity and favorable surface roughness. In addition, at least one aspect of the present disclosure is to provide a member with a surface that has both high conductivity and favorable surface roughness. In addition, at least one aspect of the present disclosure is to provide an electrophotographic image forming apparatus including the member.

At least one embodiment of the present disclosure provides a conductive dispersion solution comprising a tin oxide particle and a dispersion medium, wherein the conductive dispersion solution further comprises an organic acid, a phosphorus compound, and an amine compound, the tin oxide particle is dispersed in the dispersion medium, a cumulant average particle diameter of the tin oxide particle in the conductive dispersion solution is 90 to 400 nm, the organic acid, the phosphorus compound, and the amine compound are dissolved in the dispersion medium, and the tin oxide particle comprises an antimony-containing tin oxide particle A not treated with a silane coupling agent and an antimony-containing tin oxide particle B treated with a silane coupling agent.

Further, at least one embodiment of the present disclosure provides a resin film-forming coating material comprising a resin, the coating material comprising at least one selected from the group consisting of the resin and a precursor of the resin, a tin oxide particle, an organic acid, a phosphorus compound, and an amine compound, wherein the tin oxide particle comprises an antimony-containing tin oxide particle A not treated with a silane coupling agent and an antimony-containing tin oxide particle B treated with a silane coupling agent.

Furthermore, at least one embodiment of the present disclosure provides a resin film comprising a resin, wherein the resin film is a cured product of a coating film of the above resin-forming coating material.

Moreover, at least one embodiment of the present disclosure provides a member comprising a substrate and a resin film comprising a resin on a surface of the substrate, wherein the resin film is a cured product of a coating film of the resin-forming coating material.

In addition, at least one embodiment of the present disclosure provides an electrophotographic image forming apparatus comprising the above member as an intermediate transfer member According to at least one aspect of the present disclosure, it is possible to obtain a conductive particle dispersion solution that can form a highly conductive film and allows the film to have better surface roughness. In addition, according to at least one aspect of the present disclosure, it is possible to obtain a resin film-forming coating material which can form a resin film that has both high conductivity and favorable surface roughness.

In addition, according to at least one aspect of the present disclosure, it is possible to obtain a resin film that has both high conductivity and favorable surface roughness. In addition, according to at least one aspect of the present disclosure, it is possible to obtain a member with a surface that has both high conductivity and favorable surface roughness. In addition, according to at least one aspect of the present disclosure, it is possible to obtain an electrophotographic image forming apparatus including the member. Further features of the present invention will become apparent from the following description of exemplary embodiments with reference to the attached drawings.

BRIEF DESCRIPTION OF THE DRAWINGS

FIG. 1A to FIG. 1C show diagrams illustrating an estimated mechanism by which a resin film-forming coating material according to the present disclosure exhibits its effect; and FIG. 2 is a schematic cross-sectional diagram showing an example of an electrophotographic image forming apparatus according to the present disclosure.

DESCRIPTION OF THE EMBODIMENTS

In this specification, the statement "from XX to YY" and "XX to YY" indicating a numerical range refer to a numerical range including the lower limit and the upper limit which are end points unless otherwise noted. In addition, when the numerical range is described stepwise, the upper limit and the lower limit of each numerical range can be arbitrarily combined. In addition, in the present disclosure, for example, descriptions such as "at least one selected from the group consisting of XX, YY and ZZ" mean any of XX, YY, ZZ, the combination of XX and YY, the combination of XX and ZZ, the combination of YY and ZZ, and the combination of XX, YY, and ZZ. Here, when XX is a group, a plurality of XX may be selected, and the same applies to YY and ZZ.

In addition, in the present disclosure, the unit (LOG Ω/□) of surface resistivity is a logarithmic representation of (Ω/square).

The inventors confirmed that, in the technique disclosed in Japanese Patent Application Publication No. 2007-211155, by causing chain-like aggregation or clustering of ATO particles in a coating film or a dispersion solution, conductivity can be imparted to the coating film with a small amount of ATO particles added. However, it is found that, when the dispersion solution is mixed with a solution of a resin or a resin precursor to prepare a coating material, the resin film formed using this coating material has a roughened surface and has high surface roughness.

For example, the surface of a conductive resin member such as an intermediate transfer belt used as an electrophotographic member can be produced as follows. That is, the dispersion solution is mixed with a solution of a resin or a resin precursor to prepare a coating material, and the resin film formed using this coating material may be used as the surface of the resin member. In this case, it is found that, since the surface roughness of the resin film is large, in a sliding member that faces an intermediate transfer belt, for example, a resin cleaning blade that cleans off residual toner on the intermediate transfer belt, wear is accelerated, and the lifespan of the member is shortened. Therefore, it is found that it would be difficult to apply this to members that require a smooth surface, such as an intermediate transfer belt.

On the other hand, it has been confirmed that a surface-modified anhydrous zinc antimonate colloidal particle sol obtained by covering the surface of anhydrous zinc antimonate colloidal particles described in Japanese Patent Application Publication No. H11-314918 with a silicon-containing material has excellent particle dispersibility and shows little change in the dispersion state even after long-term storage. However, it has been found that if a dispersion solution containing the sol is mixed with a solution of a resin or a resin precursor to prepare a coating material, the resin film formed using this coating material has insufficient conductivity.

The reason why the resin film has insufficient conductivity is inferred to be as follows. When electron conductive particles such as ATO particles are used to impart conductivity, it is necessary to form a conductive path through which electrons flow by aggregating the particles in the coating film. However, it is thought that the resin film formed from the coating material prepared using a dispersion solution in which ATO particles are highly dispersed does not exhibit sufficient conductivity because it is difficult to sufficiently develop a conductive path with the ATO particles in the resin film.

Thus, the inventors conducted extensive studies in order to obtain a dispersion solution of ATO particles that can form a resin film that has both high conductivity and favorable surface roughness.

As a result, they found that the conductive dispersion solution of the present disclosure is effective in achieving the above object.

A conductive dispersion solution of the present disclosure is a conductive dispersion solution comprising a tin oxide particle and a dispersion medium, wherein
  the conductive dispersion solution further comprises an organic acid, a phosphorus compound, and an amine compound,
  the tin oxide particle is dispersed in the dispersion medium,
  a cumulant average particle diameter of the tin oxide particle in the conductive dispersion solution is 90 to 400 nm,
  the organic acid, the phosphorus compound, and the amine compound are dissolved in the dispersion medium, and
  the tin oxide particle comprises an antimony-containing tin oxide particle A not treated with a silane coupling agent and an antimony-containing tin oxide particle B treated with a silane coupling agent.

An estimated mechanism by which the dispersion solution can form a resin film having high conductivity and favorable surface roughness will be described with reference to FIG. 1. Here, the mechanism described below is merely estimated, and the present invention is not limited thereto.

FIG. 1A to FIG. 1C are diagrams illustrating an estimated mechanism by which a resin film-forming coating material according to the present disclosure exhibits its effect.

FIG. 1B shows a schematic cross-sectional diagram of a resin film formed using the coating material which is prepared by mixing the dispersion solution of the present disclosure and a solution of a resin or a resin precursor. In addition, for comparison, FIG. 1A shows a schematic cross-sectional diagram of a resin film formed in the same manner, except that only antimony-containing tin oxide particle A not treated with a silane coupling agent (hereinafter referred to as ATO particle A) 101a are used as the tin oxide particles 101. In addition, FIG. 1C shows a schematic cross-sectional diagram of a resin film formed in the same manner, except that only antimony-containing tin oxide particle B treated with a silane coupling agent (hereinafter referred to as ATO particle B) 101b are used as the tin oxide particles 101. In the diagrams, the tin oxide particles 101 are dispersed in a resin 102 as a binder resin.

A dispersion solution in which only ATO particles A101a are dispersed as tin oxide particles is mixed with a solution of a resin or a resin precursor to prepare a coating material, and in the resin film formed using this coating material, the ATO particles A101a tend to aggregate during a process of drying the coating material. Therefore, a conductive path is easily formed, and high conductivity is obtained. However, the surface roughness of the coating film increases due to aggregation of the ATO particles A101a (FIG. 1A). Therefore, it is difficult to apply this to members that require a smooth surface, such as an intermediate transfer belt used as an electrophotographic member.

On the other hand, ATO particles B101b are highly dispersed in the dispersion solution because they have been treated with a silane coupling agent. A dispersion solution in which only ATO particles B101b are dispersed as tin oxide particles 101 is mixed with a solution of a resin or a resin precursor to prepare a coating material, and in the resin film formed using this coating material, it is thought that ATO particles B101b are highly dispersed (FIG. 1C). Therefore, when the ATO particles B101b are uniformly dispersed in the resin film, the surface roughness is reduced and improved, but conversely, the ATO particles B101b are less likely to aggregate. Therefore, it is thought that it is difficult to form a conductive path and it is difficult to exhibit conductivity.

However, the dispersion solution of the present disclosure contains ATO particles A101a and ATO particles B101b. Therefore, it is thought that both an aggregation effect of the ATO particles A101a and a strong dispersion effect of the ATO particles B101b act together to form a large number of fine conductive paths as shown in FIG. 1B. A dispersion solution of the present disclosure is mixed with a solution of a resin or a resin precursor to prepare a coating material, and in the resin film formed using this coating material, it is thought that a resin film having both high conductivity and favorable surface roughness is obtained due to the above effect.

Hereinafter, each component of the conductive dispersion solution will be described in detail.

A conductive dispersion solution can be obtained by mixing ATO particle A, ATO particle B, an organic acid, a phosphorus compound, an amine compound and a dispersion medium, and dispersing the mixture with a dispersing device.

A method of producing a conductive dispersion solution is not particularly limited, and for example, a production method including a preparation step A in which an ATO particle A, an organic acid and a dispersing agent are added to a dispersion medium, and the obtained mixture is dispersed to prepare a dispersion solution A, a preparation step B in which an ATO particle B and a dispersing agent are added to a dispersion medium, and the obtained mixture is dispersed to prepare a dispersion solution B, and a mixing step in which the dispersion solution A and the dispersion solution B are mixed may be exemplified. In this case, the ratio between the dispersion solution A and the dispersion solution B in the mixing step can be set to any ratio.

In addition, the method of producing a conductive dispersion may include a preparation step C in which an ATO particle A, an ATO particle B, and a dispersing agent are added to a dispersion medium, and the obtained mixture is dispersed. Even if the materials are dispersed all at once using a dispersing device in this manner, it is possible to prepare a dispersion solution having the same physical properties as in the production method in which the dispersion solution A and the dispersion solution B are separately prepared and then mixed.

A method of dispersing a dispersion solution is not particularly limited, and for example, it is possible to use a media mill such as a ball mill, a bead mill, and a side grinder and an atomizing unit such as a high-pressure homogenizer and an ultrasonic dispersing machine, which can highly disperse inorganic particles in a wet manner.

Hereinafter, each component of the conductive dispersion solution will be described in detail.

The conductive dispersion solution contains a tin oxide particle. The tin oxide particle is dispersed in a dispersion medium. The tin oxide particle includes an antimony-containing tin oxide particle A not treated with a silane coupling agent and an antimony-containing tin oxide particle B treated with a silane coupling agent.

The total content of the ATO particle A and the ATO particle B included in the tin oxide particle is not particularly limited, and may be, for example, 95 to 100 mass % with respect to the tin oxide particle. The tin oxide particle preferably consists of the ATO particle A and the ATO particle B, but may include other particles. Examples of other particles include an indium-containing tin oxide particle, an aluminum-containing tin oxide particle, and a tin oxide particle that does not contain any metal elements other than tin. The content of other particles is not particularly limited, and may be, for example, 0.1 to 5 mass % with respect to the tin oxide particle.

Antimony-Containing Tin Oxide Particle Not Treated with Silane Coupling Agent (ATO Particle A)

The tin oxide particle includes an antimony-containing tin oxide particle A not treated with a silane coupling agent. That is, the conductive dispersion solution contains ATO particle A. The antimony-containing tin oxide is tin oxide particle containing a small amount of antimony compounds. As such ATO particles, those generally commercially available as antimony-doped tin oxide can be used. The isoelectric point of the ATO particle A is not particularly limited, and may be, for example, 2.0 to 4.0, 2.0 to 3.5, or 2.2 to 3.1.

The ATO particle A themselves have higher conductivity of the particles than zinc oxide-based conductive particles (for example, aluminum-doped zinc oxide, etc.), and are suitable as a raw material for a dispersion solution. In addition, zinc oxide is naturally mined as zincite, but it is a rare mineral that is only mined in a limited number of mines around the world. On the other hand, cassiterite, which is a raw material for tin oxide, has an advantage that it is easy to secure a supply chain because it is mined from mines from a plurality of countries.

In addition, transparent conductive particles such as indium-containing tin oxide (ITO) particle have a higher conductivity than the ATO particle A, and are suitable as a raw material for a transparent electrode film. However, indium compounds are more expensive than antimony compounds, and the material cost is higher than when the ATO particle A is used. In addition, since the ATO particle A has an ability to absorb wavelengths in the ultraviolet and infrared range, it is highly versatile as electrical and optical functional materials. As described above, there is a high market demand for the ATO particle A as a raw material for a dispersion solution due to reasons such as low cost and low geopolitical risk.

The cumulant average particle diameter of the ATO particle A in the conductive dispersion solution is preferably 1 to 1,500 nm, more preferably 90 to 1,000 nm, still more preferably 100 to 1,000 nm, and particularly preferably 100 to 500 nm. When the average particle diameter of the ATO particle A is within the above range, the ATO particle A can be easily dispersed in the dispersion solution and a coating film having high transparency can be obtained. The cumulant average particle diameter is an average particle diameter obtained by analysis using a cumulant method as described below. A specific method of measuring the cumulant average particle diameter of the ATO particle A will be described below.

A method of producing ATO particle A is not particularly limited, and for example, a method of co-precipitation and firing using a hydrolyzable tin compound and a hydrolyzable antimony compound as raw materials may be exemplified. In this method, tin and antimony compounds are simultaneously hydrolyzed in the same solution, and hydrous oxides of tin and antimony are co-precipitated to obtain a coprecipitate. In addition, salts adhered to the coprecipitate are removed by washing, and firing is then performed at 400° C. or higher to obtain ATO particle A.

When the ATO particle A is used as a transparent conductive material, in order to obtain high transparency and sufficient conductivity, the content of antimony oxide in the ATO particle with respect to 100 parts by mass of tin oxide particles is preferably 1 to 30 parts by mass, and more preferably 5 to 15 parts by mass.

The content of the ATO particle A in the conductive dispersion solution with respect to a total of 100 parts by mass of ATO particle A and ATO particle B to be described below contained in the conductive dispersion solution is preferably 10 to 90 parts by mass, more preferably 20 to 80 parts by mass, and still more preferably 25 to 75 parts by mass. Within the above range, the surface resistivity of the resin film is likely to decrease and the surface roughness is likely to decrease. In addition, when the content of the ATO particle A increases, the surface resistivity is likely to decrease and the surface roughness is likely to increase.

Here, in addition to antimony oxide, the ATO particle A may contain other elements such as silicon oxide as long as conductivity or transparency is not impaired.

Antimony-Containing Tin Oxide Particle Not Treated with a Silane Coupling Agent (ATO Particle B)]

The tin oxide particle includes an antimony-containing tin oxide particle B treated with a silane coupling agent. That is, the conductive dispersion solution contains an ATO particle B. The ATO particle B can be obtained by treating the surface of the ATO particle A with a silane coupling agent. That is, the ATO particle B can be said to be a silane coupling agent-treated product of the ATO particle A. Whether the tin oxide particle include ATO particle B is confirmed by the method described below.

A known method can be applied for the treatment of the surface of ATO particles with a silane coupling agent. The treatment method is not particularly limited, and for example, a dry method in which ATO particles are stirred with a Henschel mixer or the like and a silane coupling agent is added into a stirring container by spraying or dripping or a wet method in which, in the presence of a solvent, ATO particles and a silane coupling agent are stirred together at a high speed can be used for treatment.

The silane coupling agent not particularly limited as long as it can improve compatibility with the dispersion medium, and for example, trimethoxymethylsilane, triethoxymethylsilane, trimethoxypropylsilane, triethoxypropylsilane and the like can be suitably used. In addition, vinyltrimethoxysilane and vinyltriethoxysilane having a vinyl group in the molecular structure, 3-glycidoxypropylmethyldimethoxysilane having an epoxy group, 3-methacryloxypropyltrimethoxysilane and 3-methacryloxypropyltriethoxysilane having a methacrylic group, 3-aminopropyltrimethoxysilane and 3-aminopropyltriethoxysilane having an amino group, and the like can be used. Among these, trimethoxymethylsilane is preferable.

The amount of the silane coupling agent treatment (hereinafter referred to as a surface treatment rate) of the antimony-containing tin oxide particle B used as a raw material for the conductive dispersion solution is preferably 1.0 to 50.0 mass %. When the surface treatment rate is 1.0 mass % or less, the dispersion effect of the ATO particle B becomes weak, and when formed into a coating film, the surface roughness of the coating film may become large. In addition, when the surface treatment rate is 50.0 mass % or more, even if mixed with the ATO particle A, it may be difficult to form a conductive path in the coating film and may be difficult to exhibit conductivity.

In addition, the surface treatment rate is more preferably 5.0 to 50.0 mass %, and still more preferably 10.0 to 50.0 mass %. When the surface treatment rate is larger, the value of the surface resistivity is likely to increase and the surface roughness is likely to decrease.

The surface treatment rate can be adjusted by changing the amount of the silane coupling agent used when the ATO particle B are prepared. The surface treatment rate can be measured by analyzing the ATO particle B used as a raw material for a conductive dispersion solution using XRF.

When the antimony-containing tin oxide particle B contained in the conductive dispersion solution is measured using X-ray fluorescence, the proportion of elemental silicon in all the elements measured is preferably 5.0 to 15.0 mass % and more preferably 5.0 to 12.0 mass %.

A specific measurement method is shown below. As described below, the measurement of the ATO particle B using fluorescence X is performed by mixing the ATO particle A and the ATO particle B in the conductive dispersion solution in a mixed solution in which methyl ethyl ketone and water are mixed at a mass ratio of 1:1, separating the ATO particle A and the ATO particle B, and using the obtained ATO particle B.

As the measurement device, a wavelength-dispersive X-ray fluorescence spectrometer (XRF) is used. Here, the ATO particle A is not subjected to a silane coupling treatment, and no Si is detected. On the other hand, in the ATO particle B, silane coupling-derived Si is detected.

Specifically, first, in order to separate the ATO particle A and the ATO particle B in the conductive dispersion solution, the dispersion medium contained in the conductive dispersion solution is dried. Then, the remaining particle solid content is mixed with a mixed solution in which methyl ethyl ketone (MEK) and water are mixed at a mass ratio of 1:1, shaken well, and then left. Then, after sufficient layer separation into an aqueous layer and an MEK layer, the particles that have moved to the aqueous layer (ATO particle A) and the particles that have moved to the MEK layer (ATO particle B) are separated. Then, water or MEK is evaporated. The ATO particle B obtained after evaporation are analyzed using XRF, and the proportion of silicon atoms in all elements is calculated.

When the ATO particle B is measured by the above measurement method, if elemental silicon is measured, this indicates that the ATO particle B is the ATO particle treated with a silane coupling agent. As in the above measurement method, when a mixed solution containing MEK and water is used, the ATO particle B is contained in the MEK layer, which is an organic layer. Thereby, it is possible to remove the unreacted silane coupling agent even if the ATO particle B contains the unreacted silane coupling agent. That is, when elemental silicon is measured by the above measurement method, this indicates that the ATO particle B is the ATO particle treated with a silane coupling agent.

In addition, when the proportion of elemental silicon is within the above range, this indicates that the ATO particle B in the conductive dispersion solution are suitably treated with a silane coupling agent. Thereby, the ATO particle B is easily dispersed in the conductive dispersion solution, and when formed into a coating film, the surface roughness of the coating film is likely to decrease.

The proportion of elemental silicon can be adjusted by changing the amount of the silane coupling agent used when the ATO particle B is prepared.

The content of the ATO particle B in the conductive dispersion solution with respect to a total of 100 parts by mass of the ATO particle A and the ATO particle B contained in the conductive dispersion solution is preferably 10 to 90 parts by mass, more preferably 20 to 80 parts by mass, and still more preferably 25 to 75 parts by mass. Within the above range, the surface resistivity of the resin film is likely to decrease and the surface roughness is likely to decrease. In addition, when the content of the ATO particle B increases, the surface resistivity is likely to increase and the surface roughness is likely to decrease. This is thought to be due to the improved compatibility with the dispersion medium and improved dispersibility.

The cumulant average particle diameter of the ATO particle B in the conductive dispersion solution is preferably 1 to 1,500 nm, more preferably 90 to 1,000 nm, still more preferably 100 to 1,000 nm, and particularly preferably 100 to 500 nm. In addition, it may be the same as or different from the average particle diameter of the ATO particle A. A specific method of measuring the cumulant average particle diameter of the ATO particle B will be described below.

The content of the tin oxide particle in the conductive dispersion solution is not particularly limited, and may be 5.0 to 50.0 mass %, 10.0 to 45.0 mass %, or 20.0 to 50.0 mass %.

The cumulant average particle diameter of the tin oxide particle in the conductive dispersion solution is 90 to 400 nm, and preferably 100 to 350 nm. Within the above range, a dispersion solution that can form a highly conductive film and allows the film to have better surface roughness is obtained. A specific method of measuring the cumulant average particle diameter of the tin oxide particle will be described below.

Organic Acid

The conductive dispersion solution contains an organic acid. The organic acid is dissolved in a dispersion medium. The dispersibility of the ATO particle in the conductive dispersion solution is affected by the pH of the dispersion solution. In the process of drying the coating material using a conductive dispersion solution, when the pH in the coating film is controlled such that the pH approaches the isoelectric point of the ATO particle, it is possible to control aggregation of the ATO particle. In order to control this, the conductive dispersion solution contains an organic acid. When the conductive dispersion solution contains an organic acid, in the process of evaporating the dispersion medium from the conductive dispersion solution, the pH of the dispersion solution can be adjusted to a value closer to the isoelectric point of the ATO particle.

The organic acid is not particularly limited as long as it shifts the pH of the dispersion solution to the acidic side in the process of evaporating the dispersion medium contained in the dispersion solution. As such an organic acid, for example, carboxylic acids such as acetic acid, malic acid, lactic acid, and succinic acid, sulfonic acid, and the like can be used.

When the dispersion solution is mixed with a resin such as a (meth)acrylic resin or a urethane resin to prepare a resin film-forming coating material, the compatibility is improved when the coating material contains an organic acid. In addition, the organic acid is preferably a low-molecular-weight compound such as acetic acid or malic acid, and more preferably a weak acid. One type of organic acid may be used alone or a plurality of types thereof may be used in combination.

The content of the organic acid in the conductive dispersion solution with respect to 100 parts by mass of tin oxide particles is preferably 0.10 to 5.00 parts by mass, more preferably 0.10 to 3.00 parts by mass, still more preferably 0.10 to 2.00 parts by mass, yet more preferably 0.20 to 2.00 parts by mass, particularly preferably 0.40 to 2.00 parts by mass, and most preferably 0.50 to 2.00 parts by mass.

Within the above range, in the dispersion solution state, since the pH of the conductive dispersion solution is away from the isoelectric point of the ATO particle, the aggregation effect is likely to be weak. Therefore, the steric repulsive effect of the tin oxide particle caused by the amine compound to be described below prevails, and thus it is easier to maintain the tin oxide particle in a highly dispersed state. In addition, in the process of evaporating the dispersion medium from the conductive dispersion solution, the pH tends to shift to the acidic side. Accordingly, the zeta potential of the tin oxide particle in the dispersion solution also tends to shift toward 0 mV (isoelectric point). As a result, the aggregation effect tends to prevail over the steric repulsive effect, it is easier to control aggregation of the tin oxide particle, and the tin oxide particle easily forms a conductive path.

Amine Compound

The conductive dispersion solution contains an amine compound. The amine compound is dissolved in a dispersion medium. Since the amine compound can increase the dispersion stability of the ATO particle in the dispersion solution, when the conductive dispersion solution contains an amine compound and the amine compound is dissolved in a dispersion medium, it is possible to prolong the pot life of the conductive dispersion solution. That is, the amine compound acts as a dispersing agent.

The amine compound is not limited, and at least one compound selected from the group consisting of secondary amines and tertiary amines represented by the following Formula (1) is particularly preferable.

(1)

In Formula (1), $R^1$ and $R^2$ are each independently an aliphatic hydrocarbon group (an alkyl group having preferably 1 to 23 carbon atoms, more preferably 3 to 23 carbon atoms, still more preferably 6 to 23 carbon atoms, and particularly preferably 7 to 17 carbon atoms), and $R^3$ is a hydrogen atom or an aliphatic hydrocarbon group (an alkyl group having preferably 1 to 23 carbon atoms, more preferably 3 to 23 carbon atoms, still more preferably 6 to 23 carbon atoms, and particularly preferably 7 to 17 carbon atoms).

Such an amine compound is not particularly limited, and examples thereof include secondary amines such as diisopropylamine, di-n-propylamine, di-n-heptylamine, dicycloheptylamine, di-n-octylamine, dicyclooctylamine, di-n-nonylamine, di-n-decylamine, di-n-undecylamine, di-n-dodecylamine, di-n-tridecylamine, di-n-tetradecylamine, di-n-pentadecylamine, di-n-hexadecylamine, and di-n-heptadecylamine.

In addition, examples thereof include tertiary amines such as tri-n-butylamine, tri-n-pentylamine, tricyclopentylamine, tri-n-hexylamine, tricyclohexylamine, tri-n-heptylamine, tricycloheptylamine, tri-n-octylamine, tri-n-nonylamine, tri-n-decylamine, tri-n-undecylamine, dimethyl-n-undecylamine, dimethyl-n-dodecylamine, dimethyl-n-tridecylamine, dimethyl-n-octadecylamine, dimethyl-n-hexadecylamine, dimethyl-n-heptadecylamine, and dimethyl-n-octadecylamine. The amine compound is preferably a tertiary amine. Particularly, tri-n-octylamine, tri-n-butylamine, tri-n-hexylamine, dimethyl-n-octadecylamine, and tri-n-undecylamine are likely to further improve dispersibility of the ATO particles in the conductive dispersion solution and are likely to prolong the pot life. One type of amine compound may be used alone or a plurality of types thereof may be used in combination.

The reason why the dispersion stability of the ATO particle in the conductive dispersion solution is improved by the inclusion of the amine compound is thought to be as follows. That is, it is thought that the amine compound is bonded to the surface of the ATO particle, and the aliphatic hydrocarbon group of the amine compound causes a steric repulsive effect (steric hindrance) between the ATO particle. Such dispersion stabilization due to steric hindrance can be improved when the number of aliphatic hydrocarbon groups increases. Therefore, the amine compound is preferably at least one compound selected from the group consisting of secondary amines and tertiary amines.

In addition, when the length of the aliphatic hydrocarbon group is longer, dispersion stabilization due to steric hindrance is more likely to occur. Therefore, it is thought that, when the molecular weight of the aliphatic hydrocarbon group is larger, stabilization tends to occur. Therefore, in order to more sufficiently stabilize the dispersion of the ATO particle in the conductive dispersion solution, the molecular weight is preferably 100 or more, more preferably 150 or more, and still more preferably 180 or more. When the molecular weight of the amine compound is 100 or more, sufficient steric hindrance occurs in the conductive dispersion solution, and it becomes easier to prevent aggregation and precipitation of the ATO particle in the conductive dispersion solution. As a result, the surface roughness is likely to decrease. In addition, the pot life of the dispersion solution is improved.

In addition, when the molecular weight of the amine compound is 500 or less, in the process of drying the coating film of the resin film-forming coating material, the electrostatic aggregation force acting on the ATO particle due to an increase in pH in the coating film can be easily made stronger than the steric repulsion force caused by the amine compound. Therefore, the formation of a conductive path with the ATO particle in the process of drying the coating film is accelerated, and the conductivity of the resin film can be more easily exhibited. In addition, it is possible to prevent the surface of the ATO particle from being covered with the aliphatic hydrocarbon group, which would occur if the aliphatic hydrocarbon group of the amine compound is too long. As a result, the conductivity of the ATO particle itself is less likely to decrease. Therefore, this contributes to the formation of a resin film having conductivity.

As shown above, the molecular weight of the amine compound is preferably 180 to 500, particularly preferably 200 to 500, and still more preferably 250 to 450.

The content of the amine compound in the conductive dispersion solution is not particularly limited as long as it is within a range in which the above effect is exhibited, and is preferably 0.05 to 5.00 parts by mass, more preferably 0.10 to 3.00 parts by mass, still more preferably 0.20 to 1.00 parts by mass, and particularly preferably 0.25 to 1.00 parts by mass with respect to 100 parts by mass of the tin oxide particle. Within this range, the tin oxide particle has a sufficient dispersion stabilization effect and the aggregation effect prevails over the steric repulsive effect in the process of drying the coating film, and thus it is easier to control aggregation of the tin oxide particle and the tin oxide particle easily forms a conductive path. That is, this contributes to the formation of a resin film having conductivity. In addition, the dispersion solution tends to have a pH higher than the isoelectric point of the tin oxide particle.

Phosphorus Compound

The conductive dispersion solution contains a phosphorus compound. The phosphorus compound is dissolved in a dispersion medium. The phosphate group in the phosphorus compound is thought to have a strong dispersion effect because it more strongly adheres to metal oxides than that of the above amine compound. Therefore, when the phosphorus compound adheres to the ATO particle, the particle is less likely to cause an aggregation effect according to a pH change in the drying process. As a result, it is thought that there is an effect of preventing excessive aggregation of the ATO particle. Therefore, when a coating film is formed using the conductive dispersion solution of the present disclosure, the ATO particle aggregates due to the effect of the organic acid, but the ATO particle to which the phosphorus compound adheres maintain a repulsive effect. Therefore, it is thought that the state shown in FIG. 1B is easily formed.

The molecular weight of the phosphorus compound is preferably 300 to 5,000.

Like the amine compound, when the molecular weight of the phosphorus compound is larger, the dispersion stabilization effect due to steric hindrance is improved. On the other hand, in order to sufficiently minimize the aggregation effect of the ATO particle in the drying process, it is more preferable that the molecular weight of the phosphorus compound be equal or more than the molecular weight of the amine compound. Thereby, the ATO particle is prevented from aggregating and more stably and easily dispersed. On the other hand, when the molecular weight is too large, the compatibility with the dispersion medium may decrease. Therefore, the molecular weight of the phosphorus compound is preferably 300 to 5,000, more preferably 500 to 5,000, and particularly preferably 800 to 2,000.

The phosphorus compound is preferably at least one compound selected from the group consisting of diesters and triesters represented by the following Formula (2), and more preferably a diester represented by the following Formula (2).

(2)

In Formula (2), $R^4$ to $R^6$ are a hydrogen atom or an organic group, and at least two selected from the group consisting of $R^4$ to $R^6$ are an organic group.

The organic group is not particularly limited, and may be a monovalent organic group and may have a divalent linking group between a monovalent organic group and an oxygen atom adjacent to a phosphorus atom. Examples of monovalent organic groups include a hydrocarbon group and an amino group. Examples of hydrocarbon groups include an aliphatic hydrocarbon group and an aromatic hydrocarbon group, and specific examples thereof include an alkyl group, a vinyl group, a phenyl group, and an alkylphenyl group. The hydrocarbon group may be linear, branched or cyclic. In addition, the hydrocarbon group may be unsubstituted or may have any functional group.

The number of carbon atoms of the hydrocarbon group is not particularly limited, and may be, for example, 2 to 50 or 3 to 20.

As the divalent linking group, a known linking group can be used, and examples thereof include an alkylene group, an ether group, an ester group, and an amine group. The alkylene group may be linear, branched or cyclic. The alkylene group may be unsubstituted or may have any functional group. In addition, those having a plurality of divalent linking groups may be used.

The number of carbon atoms of the alkylene group is not particularly limited, and may be, for example, 1 to 50, and is preferably 3 to 20.

As such a phosphorus compound, generally commercially available products can be used, and for example, DA325 and DA375 (commercially available from Kusumoto Chemicals, Ltd.), Phosphanol Series (commercially available from TOHO Chemical Industry Co., Ltd.), JP-502, JP-504, and JP-506H (commercially available from Johoku Chemical Co., Ltd.), and DISPERBYK-111 (commercially available from BYK) can be used.

The diesters and triesters represented by Formula (2) can improve compatibility with hydrophobic dispersion media such as methyl ethyl ketone (MEK) and methyl isobutyl ketone (MIBK) due to the effect of the organic group such as an alkyl group, an ether group, an ester group, and an amine group bonded to the phosphate group. Therefore, it easily acts as a dispersing agent for inorganic particles.

The content of the phosphorus compound in the conductive dispersion solution is not particularly limited as long as it is within a range in which the above effect is exhibited, and is preferably 0.25 to 10.00 parts by mass, more preferably 0.50 to 10.00 parts by mass, still more preferably 0.50 to 5.00 parts by mass, particularly preferably 1.00 to 5.00 parts by mass, and most preferably 1.25 to 5.00 parts by mass with respect to 100 parts by mass of the tin oxide particle.

Dispersion Medium

The conductive dispersion solution contains a dispersion medium. The dispersion medium is not particularly limited as long as it is one generally used in the coating material, and an organic solvent is preferable. For example, aliphatic alcohols such as methyl alcohol, ethyl alcohol, isopropyl alcohol, and isobutyl alcohol, aromatic alcohols such as benzyl alcohol, and ketones such as methyl isobutyl ketone, methyl ethyl ketone, diisobutyl ketone, and cyclohexanone can be used. One type of these organic solvents may be used alone or two or more types thereof may be used in combination. In addition, even when the coating film of the resin film-forming coating material is dried in a normal temperature environment such as at a temperature of 23° C., it is preferable that the dispersion medium contain a volatile organic solvent such as isopropyl alcohol or methyl ethyl ketone because the pH in the coating film can be increased more easily.

The content of the dispersion medium in the conductive dispersion solution is not particularly limited, and may be appropriately set depending on the viscosity of the conductive dispersion solution and the like, and is preferably 20 to 90 mass % and more preferably 30 to 90 mass %.

Polydispersity Index

The polydispersity index of the tin oxide particle in the conductive dispersion solution is not particularly limited, and a smaller value is preferable. A smaller polydispersity index value indicates a narrower particle diameter distribution. That is, it is closer to monodispersity.

The polydispersity index is preferably 0.500 or less, more preferably 0.400 or less, and still more preferably 0.360 or less. The lower limit is not particularly limited, and may be 0.000 to 0.500, 0.000 to 0.400, or 0.000 to 0.360. The polydispersity index value can be reduced by highly dispersing the tin oxide particles.

A method of measuring a polydispersity index value will be described below.

Resin Film-Forming Coating Material

A resin film-forming coating material according to at least one aspect of the present disclosure is a resin film-forming coating material containing a resin, which contains at least one selected from the group consisting of the resin and a precursor of the resin, a tin oxide particle, an organic acid, a phosphorus compound, and an amine compound, and the tin oxide particle include an antimony-containing tin oxide particle A not treated with a silane coupling agent and an antimony-containing tin oxide particle B treated with a silane coupling agent. In such a configuration, the organic acid, the phosphorus compound, and the amine compound are dissolved in the coating material.

When such a resin film-forming coating material is used, it is possible to stably form a resin film having high conductivity and having little surface roughness. This is thought to be due to the estimated mechanism described above.

As the antimony-containing tin oxide particle A not treated with a silane coupling agent, the antimony-containing tin oxide particle B treated with a silane coupling agent, the organic acid, the phosphorus compound, and the amine compound, those described in the above respective sections can be used.

The resin film-forming coating material contains at least one selected from the group consisting of a resin and a precursor of the resin.

The resin is not particularly limited, and a thermoplastic resin, a thermosetting resin, an ionizing radiation curable resin and the like can be used. Examples of ionizing radiation curable resins include resins that can be cured with ultraviolet rays or electron beams, such as UV curable resins and electron beam curable resins, and for example, (meth) acrylic resins may be exemplified. (Meth)acrylic resins are a general term for acrylic resins and methacrylic resins.

The resin precursor is not particularly limited, and for example, monomers, oligomers, or polymers of a thermosetting resin or an ionizing radiation curable resin can be used as the resin precursor. When a resin precursor is used, for example, if the resin film-forming coating material contains a polymerization initiator such as a photopolymerization initiator, the resin precursor can be polymerized and cured by heat, ultraviolet rays, electron beams or the like to form a resin. For example, precursors of (meth)acrylic resins include monomers and oligomers that can form (meth) acrylic resins. The monomers and oligomers are not particularly limited, and known ones can be used.

The content of at least one selected from the group consisting of a resin and a precursor of the resin in the resin film-forming coating material is not particularly limited, and for example, it is preferably 5.0 to 30.0 mass % and more preferably 5.0 to 20.0 mass %.

The (meth)acrylic resin is preferably at least one polymer selected from the group consisting of pentaerythritol tri(meth)acrylate, pentaerythritol tetra(meth)acrylate, ditrimethylolpropane tetra(meth)acrylate, dipentaerythritol hexa(meth)acrylate, alkyl (meth)acrylate, benzyl (meth)acrylate, phenyl (meth)acrylate, ethylene glycol di(meth)acrylate, and bisphenol A di(meth)acrylate.

The (meth)acrylic resin is more preferably at least one polymer selected from the group consisting of pentaerythritol tri(meth)acrylate, and pentaerythritol tetra(meth)acrylate. The (meth)acrylic resin is still more preferably a polymer of pentaerythritol triacrylate and pentaerythritol tetraacrylate.

In addition, examples of thermosetting resins include urethane resins, melamine resins, phenolic resins, and unsaturated polyester resins. Examples of thermoplastic resins include polyamide resins, polyimide resins, and polyvinyl chloride resins.

As the resin, one type of the above resins may be used alone or a plurality of types thereof may be used in combination.

The solid content concentration of the resin film-forming coating material may be appropriately set in consideration of ease of application, the film thickness when formed into a coating film, the conductivity and the like. For example, with respect to 100 parts by mass of at least one polymer selected from the group consisting of a resin and a precursor of the resin in the resin film-forming coating material, the content of the tin oxide particle may be 3.0 to 50.0 parts by mass, is preferably 3.0 to 40.0 parts by mass, and more preferably 3.0 to 35.0 parts by mass. In addition, the content may be 24.0 to 50.0 parts by mass, is preferably 24.0 to 40.0 parts by mass, and more preferably 24.0 to 35.0 parts by mass. It is preferably within the above range so that it is possible to reduce the content of the tin oxide particle in the resin film and allow the resin film to have excellent conductivity while maintaining transparency.

The resin film-forming coating material may contain an organic solvent. The organic solvent that the resin film-forming coating material may contain may include an organic solvent that can dissolve at least a part of the above resin or at least a part of the above resin precursor. For example, the organic solvents described in the above dispersion medium section can be used.

In addition, the resin film-forming coating material may contain, as necessary, other additives, as long as the effects of the present disclosure are not impaired. For example, it is possible to add a curing initiator, a leveling agent, an antifoaming agent, a lubricant, other organic compounds, inorganic compounds and the like.

As the method of producing a resin film-forming coating material, a known stirring method can be used. For example, the resin film-forming coating material can be produced through a mixing step in which the dispersion solution according to the present disclosure, at least one selected from the group consisting of a resin and a precursor of the resin, as necessary, other organic solvents and other additives, are mixed, and a uniformizing step in which the mixture obtained in the mixing step is mixed uniformly using a dispersing device such as a mechanical stirrer or a paint shaker that shakes the coating material at a high speed.

Resin Film Containing ATO Particle

The resin film includes a cured product of the resin film-forming coating material of the present disclosure. Specifically, the resin film-forming coating material is uniformly coated on the surface of the substrate by a known film forming method, for example, gravure coating, wire bar coating, spray coating, dip coating, or slit coating, to form a coating film. This coating film is dried and as necessary, the resin precursor is cured to cure the coating film, and thus a resin film is formed. Examples of drying and necessary curing treatments include a heat treatment and a UV emission treatment. As described above, the dispersion solution according to the present disclosure can form a resin film having excellent conductivity and little surface roughness. Therefore, the resin film according to the present disclosure can be suitably used as a conductive resin film for which surface smoothness is particularly required. Specifically, the resin film can be very suitably used for applications such as a surface layer film of an intermediate transfer belt, which is an electrophotographic member that slides against other members, and a conductive optical film for which minimizing light scattering on the surface is required.

The thickness of the resin film is not particularly limited, and may be, for example, 1.00 to 5.00 m, or 1.50 to 4.00 km. A method of measuring the thickness of the resin film will be described below.

The value of the arithmetic mean height Sa of the resin film is not particularly limited, and a small value is preferable. For example, the value is preferably 0.0200 m or less, more preferably 0.0100 m or less, still more preferably 0.0050 m or less, and particularly preferably 0.0042 m or less. The lower limit is not particularly limited, and may be 0.0000 to 0.0200 m, 0.0000 to 0.0100 m, 0.0000 to 0.0050 m, or 0.0000 to 0.0042 km. A method of measuring the arithmetic mean height Sa will be described below.

The value of the surface resistivity of the resin film is not particularly limited, and a smaller value is preferable. For example, the value is preferably 11.00 LOG $\Omega/\square$ or less, more preferably 10.50 LOG $\Omega/\square$ or less, and still more preferably 10.20 LOG $\Omega/\square$ or less. The lower limit is not particularly limited, and may be 5.00 to 11.00 LOG $\Omega/\square$, 5.00 to 10.50 LOG $\Omega/\square$, or 5.00 to 10.20 LOG $\Omega/\square$. A method of measuring the surface resistivity will be described below.

Member

The member of the present disclosure is a member including a substrate and a resin film on the surface of the substrate, and the coating film is a member containing a cured product of a coating film of the resin film-forming coating material of the present disclosure. When such a member is used, a member having excellent conductivity and a surface with low roughness is obtained.

The material used for the substrate is not particularly limited, and plastic, glass, metals, ceramic and the like can be used.

Electrophotographic Member

The application of the member is not particularly limited. For example, the member is suitably used as an electrophotographic member such as an intermediate transfer member that temporarily transfers and holds a toner image or a transport transfer belt that inserts and holds and transports a recording material as a transfer material. That is, the member is preferably an electrophotographic member. For example, the electrophotographic member is an electrophotographic belt. The electrophotographic member is particularly preferably used as an intermediate transfer member. That is, the electrophotographic member is preferably an intermediate transfer member. The electrophotographic member may have an endless shape.

Electrophotographic Image Forming Apparatus

FIG. 2 shows an example of an image forming apparatus including the member according to at least one aspect of the present disclosure as an intermediate transfer member, which is configured as an electrophotographic device. That is, FIG. 2 is a schematic cross-sectional diagram showing an example of an electrophotographic image forming apparatus.

The image forming apparatus forms a color image on a recoding medium S such as paper supplied from a paper feeding cassette 20 using toners with four colors represented by cyan (C), magenta (M), yellow (Y), and black (K), and image forming stations for the colors are arranged by side by side in a substantially horizontal direction.

In these image forming stations, photosensitive drums 1c, 1m, 1y, and 1k are provided. Here, the suffix "c," "m," "y" or "k" added to the reference sign indicates which color image forming station the member with the reference sign belongs to. In the electrophotographic image forming apparatus, a laser scanner 3, which is a laser optical unit, is provided, and laser beams 3c, 3m, 3y, and 3k corresponding to image signals for respective colors are emitted therefrom toward the photosensitive drums 1c, 1m, 1y, and 1k. Since all the image forming stations have the same structure, the image forming station for K color will be described here.

A conductive roller 2k which is a contact charging device, a developing device 4k, a conductive roller 8k which is a primary transfer roller, and a toner recovery blade 14k used for cleaning the photosensitive drum 1k are disposed to surround the photosensitive drum 1k. The developing device 4k includes a developing roller 41k which is a developing material bearing member that develops a latent image on the photosensitive drum 1k, a developer container 42k that holds toner to be supplied to the developing roller 41k, and a developing blade 43k that regulates the amount of toner on the developing roller 41 and applies a charge.

An electrophotographic belt 5 is configured as a belt having an endless shape. Here, the electrophotographic belt 5 is provided in common in the image forming stations of respective colors, stretched over a secondary transfer counter-roller 92, a tension roller 6 and a driver roller 7, and rotated by the driver roller 7 in the direction of the arrow shown in the drawing. The electrophotographic belt 5 comes into contact with the surfaces of the photosensitive drums 1c, 1m, 1y, and 1k in sequence in the section between the tension roller 6 and the driver roller 7, and pressed against the photosensitive drums 1c, 1m, 1y, and 1k by primary transfer rollers 8c, 8m, 8y, and 8k. Thereby, the toner image formed on the surfaces of the photosensitive drums 1c, 1m, 1y, and 1k is transferred onto the surface of the electrophotographic belt 5 which is an intermediate transfer member. The density of the toner image transferred onto the intermediate transfer belt is detected by an image density sensor 160, and image position deviation is appropriately adjusted based on the detection results.

A secondary transfer roller 9 is provided to face the secondary transfer counter-roller 92, and the electrophotographic belt 5 is pressed against the secondary transfer counter-roller 92 by the secondary transfer roller 9. A secondary transfer voltage is applied to the secondary transfer roller 9 from a power source through a current detection circuit 10. The secondary transfer roller 9 and the secondary transfer counter-roller 92 constitute a secondary transfer section. The recoding medium S passes through a nip part between the electrophotographic belt 5 and the secondary transfer roller 9 at the position of the secondary transfer counter-roller 92 via a feed roller 12 and a transport roller 13, and the toner image held on the outer peripheral surface of the electrophotographic belt 5 is transferred. Thereby, an image is formed on the surface of the recoding medium S.

The recoding medium S onto which the toner image is transferred passes through a fixing unit 15 composed of a pair of rollers including a heat roller 151 and a pressure roller 152, the image is fixed, and the recoding medium S is discharged to a paper discharge tray 2l. At the position of the tension roller 6, the cleaning blade 3l that comes into contact with the outer peripheral surface of the electrophotographic belt 5 is provided. The toner remaining on the outer peripheral surface of the electrophotographic belt 5 without being transferred to the recoding medium S is removed from the electrophotographic belt 5 and recovered by a belt cleaning device 30.

EXAMPLES

Hereinafter, the present disclosure will be described in more detail with reference to examples. The aspects of the present disclosure are not limited to the following examples.

First, methods of evaluating physical properties of a dispersion solution, a resin film-forming coating material, and a resin film containing a cured product of a coating film of a resin film-forming coating material will be described.
Average Particle Diameter of ATO Particle The average particle diameter of ATO particle in the dispersion solution was measured using a particle diameter distribution meter (Multi-Sample Nanoparticle Size Measurement System nanoSAQLA, commercially available from Otsuka Electronics Co., Ltd.) that calculates the average particle diameter by a dynamic light scattering method. The measurement was performed using the dispersion solution as it was without diluting it, using AS cells, with a cumulative number of 50 measurements, at a temperature of 25.0° C.

As measurement conditions, the refractive index and viscosity were set according to the dispersion medium used. For example, when the dispersion medium was methyl ethyl ketone, the refractive index was set to 1.364, and the viscosity was set to 0.421 mPa·s, and when the dispersion medium was isopropyl alcohol, the refractive index was set to 1.3813, and the viscosity was set to 2.0335 mPa·s.

In addition, when the dispersion medium was a mixed solvent, the refractive index and the viscosity were set according to the type and proportion of each dispersion medium. For example, when the dispersion medium was a mixed solvent of methyl ethyl ketone and isopropyl alcohol, the refractive index of the mixed solvent was obtained using the following Formula (A) where the mass proportion of methyl ethyl ketone in the mixed solvent is x1 (mass %) and the mass proportion of isopropyl alcohol is x2 (mass %). The viscosity was calculated in the same manner.

$$1.364 \times x1/100 + 1.3813 \times x2/100 \quad \text{(A)}$$

In order to analyze the average particle diameter, the cumulant method was used for calculation. Specifically, it could be obtained from an autocorrelation function obtained by a photon correlation method using the cumulant method, and the polydispersity index (PDI) indicating a particle diameter distribution width was also measured using the same device. Generally, a smaller PDI value indicates a narrower particle diameter distribution and it is closer to monodispersity, and when the PDI exceeds 0.5, it indicates that it is difficult to analyze the measurement results.
Surface Resistivity of Resin Film The surface resistivity of the resin film was measured using a resistivity meter (product name: Hiresta UP MCP-HT450 type, commercially available from Mitsubishi Chemical Analytech Co., Ltd.) according to Japan Industrial Standards (JIS) K 6911. The surface resistivity of the resin film was measured using a PEN film having a resin film on its surface produced by the method described below. In order to measure the surface resistivity of the resin film, a UR100 probe was brought into contact with the resin film on the surface of the PEN film in an environment of a temperature of 23° C. and a relative humidity of 50%, and the value obtained at an applied voltage of 100 V and a measurement time of 10 seconds was calculated as a measured value.

Surface Roughness of Resin Film

The surface roughness of the resin film was evaluated by the arithmetic mean height Sa of the resin film. As the measurement device, a scanning white-light interference microscope (product name: Vert Scan, commercially available from Ryoka Systems Inc.) was used for measurement. Observation was performed using a 5× objective lens, the obtained image was subjected to fourth-order curve correction to remove waviness, and Sa was then obtained from the corrected image.

Thickness of Resin Film

The thickness of the resin film was measured by the following procedure. A cross section of the resin film was taken using an ion milling device (device name: IM4000, commercially available from Hitachi High-Tech Corporation), the cross section was observed under a scanning electron microscope (device name: JSM-F100, commercially available from JEOL Ltd.), and the thickness of the resin film was measured. In Examples 1 to 11 and Comparative Examples 1 to 5, the resin film was cut out from the center of each PEN film. In addition, in Example 12, and Comparative Examples 6 and 7, the resin film was cut out at four locations on each intermediate transfer belt. In this case, four locations were set at equal intervals such that they were not arbitrary. Specifically, four locations were set at 90° intervals in the circumferential direction around the center of the intermediate transfer belt in the width direction.

Next, a method of preparing a conductive dispersion solution in examples will be described in detail. In the examples, the conductive dispersion solution was prepared by separately preparing a dispersion solution A using ATO particle A not treated with a silane coupling agent and a dispersion solution B using ATO particle B treated with a silane coupling agent, and mixing them at any ratio.

Hereinafter, preparation examples of the dispersion solution A and the dispersion solution B will be described.

Preparation of Dispersion Solution A-1

12.0 g of antimony-containing tin oxide particle (product name: SN-100P, commercially available from Ishihara Sangyo Kaisha, Ltd.), 0.12 g of acetic acid (commercially available from Kishida Chemical Co., Ltd.) as an organic acid, 0.03 g of trioctylamine (commercially available from Kishida Chemical Co., Ltd.) as an amine compound, and 48.0 g of isopropyl alcohol (commercially available from Kishida Chemical Co., Ltd.) as a solvent were weighed out and put into a 250 mL zirconia container. In addition, 108.3 g of zirconia beads with a diameter of 0.5 mm was put into the container. Then, the mixture was stirred using a planetary ball mill (model: P-6, commercially available from Fritsch Japan Co., Ltd.) at 400 rpm for 3 hours. Then, the beads were removed by mesh filtration to obtain a dispersion solution A-1 having a solid content concentration of ATO particle (that is, the content of the ATO particle in the dispersion solution) of 20 mass %.

The average particle diameter of ATO particle contained in the dispersion solution A-1 was measured to be 167.5 nm, and the polydispersity index was 0.281.

Preparation of Dispersion Solution A-2

A dispersion solution A-2 was obtained in the same manner as in the dispersion solution A-1 except that the amine compound was changed to diisopropylamine (commercially available from Tokyo Chemical Industry Co., Ltd., molecular weight: 101.2), and the amount of the amine compound was changed to the content shown in Table 1. The average particle diameter of ATO particle contained in the dispersion solution A-2 was measured to be 348.1 nm, and the polydispersity index was 0.391.

Preparation of Dispersion Solution A-3

A dispersion solution A-3 was obtained in the same manner as in the dispersion solution A-1 except that the amine compound was changed to tri-n-butylamine (commercially available from Tokyo Chemical Industry Co., Ltd., molecular weight: 185.4), and the amount of the amine compound was changed to the content shown in Table 1. The average particle diameter of ATO particle contained in the dispersion solution A-3 was measured to be 274.7 nm, and the polydispersity index was 0.358.

Preparation of Dispersion Solution A-4

A dispersion solution A-4 was obtained in the same manner as in the dispersion solution A-1 except that the amine compound was changed to tri-n-undecylamine (commercially available from Tokyo Chemical Industry Co., Ltd., molecular weight: 479.9), and the amount of the amine compound was changed to the content shown in Table 1. The average particle diameter of ATO particle contained in the dispersion solution A-4 was measured to be 142.7 nm, and the polydispersity index was 0.266.

Preparation of Dispersion Solution A-5

A dispersion solution A-5 was obtained in the same manner as in the dispersion solution A-1 except that no organic acid was used. The average particle diameter of ATO particle contained in the dispersion solution A-5 was measured to be 247.4 nm, and the polydispersity index was 0.332.

Preparation of Dispersion Solution A-6

A dispersion solution A-6 was obtained in the same manner as in the dispersion solution A-1 except that no amine compound was used. The average particle diameter of ATO particle contained in the dispersion solution A-6 was measured to be 2296.9 nm, and the polydispersity index was 1.505.

Preparation of Dispersion Solution B-1

100 g of antimony-containing tin oxide particle (product name: SN-100P, commercially available from Ishihara Sangyo Kaisha, Ltd.) was put into a Henschel mixer, and while rotating the mixer at 80 rpm in a room temperature and normal humidity environment, 3.79 g of trimethoxymethylsilane (product name KBM-13, commercially available from Shin-Etsu Silicones) was added dropwise, and the mixture was stirred for 2 hours. Then, the obtained powder was taken out, and heated and dried in a drying furnace at 100° C. for 1 hour to obtain ATO particle having a surface treatment rate of 30 mass %.

12.50 g of ATO particles having a surface treatment rate of 30 mass %, 0.09 g of trioctylamine (commercially available from Kishida Chemical Co., Ltd.) as an amine compound, 0.50 g of phosphate polyester (product name: BYK111, commercially available from BYK-Chemie, GmbH, a molecular weight of about 800 to 1,500) as a phosphorus compound, and 18.13 g of 2-butanone (commercially available from Kishida Chemical Co., Ltd.) as a solvent were weighed out and put into a 250 mL zirconia container. In addition, 42.86 g of zirconia beads with a diameter of 0.5 mm was put into the container. Then, the mixture was stirred using a planetary ball mill (model: P-6, commercially available from Fritsch Japan Co., Ltd.) at 400 rpm for 3 hours. Then, the beads were removed by mesh filtration to obtain a dispersion solution B-1 having a solid content concentration of ATO particle (that is, the content of the ATO particle in the dispersion solution) of 40 mass %.

The average particle diameter of ATO particle contained in the dispersion solution B-1 was measured to be 299.1 nm, and the polydispersity index was 0.305.

Preparation of Dispersion Solution B-2

ATO particle having a surface treatment rate of 10 mass % were obtained in the same method as in the dispersion solution B-1 preparation section except that the amount of trimethoxymethylsilane was changed to 1.26 g.

A dispersion solution B-2 was obtained in the same method as in the dispersion solution B-1 preparation section except that the ATO particle having a surface treatment rate of 30 mass % were changed to ATO particle having a surface treatment rate of 10 mass %. The solid content concentration of ATO particle in the dispersion solution B-2 was 40 mass %.

The average particle diameter of ATO particle contained in the dispersion solution B-2 was measured to be 347.3 nm, and the polydispersity index was 0.327.

Preparation of Dispersion Solution B-3

ATO particle having a surface treatment rate of 50 mass % were obtained in the same method as in the dispersion solution B-1 preparation section except that the amount of trimethoxymethylsilane was changed to 6.31 g.

A dispersion solution B-3 was obtained in the same method as in the dispersion solution B-1 preparation section except that the ATO particle having a surface treatment rate of 30 mass % were changed to ATO particle having a surface treatment rate of 50 mass %. The solid content concentration of ATO particle in the dispersion solution B-3 was 40 mass %.

The average particle diameter of ATO particle contained in the dispersion solution B-3 was measured to be 96.7 nm, and the polydispersity index was 0.285.

Preparation of Dispersion Solution B-4

A dispersion solution B-4 was obtained in the same manner as in the dispersion solution B-1 except that the amine compound was changed to diisopropylamine (commercially available from Tokyo Chemical Industry Co., Ltd., molecular weight: 101.2), and the amount of the amine compound was changed to the content shown in Table 2. The average particle diameter of ATO particle contained in the dispersion solution B-4 was measured to be 457.1 nm, and the polydispersity index was 0.353.

Preparation of Dispersion Solution B-5

A dispersion solution B-5 was obtained in the same manner as in the dispersion solution B-1 except that the amine compound was changed to tri-n-butylamine (commercially available from Tokyo Chemical Industry Co., Ltd., molecular weight: 185.4), and the amount of the amine compound was changed to the content shown in Table 2. The average particle diameter of ATO particle contained in the dispersion solution B-5 was measured to be 378.0 nm, and the polydispersity index was 0.338.

Preparation of Dispersion Solution B-6

A dispersion solution B-6 was obtained in the same manner as in the dispersion solution B-1 except that the amine compound was changed to tri-n-undecylamine (commercially available from Tokyo Chemical Industry Co., Ltd., molecular weight: 479.9), and the amount of the amine compound was changed to the content shown in Table 2. The average particle diameter of ATO particle contained in the dispersion solution B-6 was measured to be 242.9 nm, and the polydispersity index was 0.301.

Preparation of Dispersion Solution B-7

A dispersion solution B-7 was obtained in the same manner as in the dispersion solution B-1 except that the phosphorus compound was changed to tris(2-butoxyethyl) phosphate (commercially available from Tokyo Chemical Industry Co., Ltd., molecular weight: 398.48), and the amount of the phosphorus compound and the amount of the amine compound were changed to the contents shown in Table 2. The average particle diameter of ATO particle contained in the dispersion solution B-7 was measured to be 497.1 nm, and the polydispersity index was 0.362.

Preparation of Dispersion Solution B-8

A dispersion solution B-8 was obtained in the same manner as in the dispersion solution B-1 except that no amine compound was used. Measurement of the average particle diameter of ATO particle contained in the dispersion solution B-8 was attempted, but the particles were severely aggregated, and the particle diameter exceeded the measurement limit and could not be measured.

Preparation of Dispersion Solution B-9

A dispersion solution B-9 was obtained in the same manner as in the dispersion solution B-1 except that no phosphorus compound was used, and the amount of the amine compound was changed to the content shown in Table 2. The average particle diameter of ATO particle contained in the dispersion solution B-9 was measured to be 5352.8 nm, and the polydispersity index was 0.917.

Table 1 shows the types and contents of materials of the dispersion solutions A-1 to A-6, and physical properties of the dispersion solution A. In addition, Table 2 shows the types and contents of materials of the dispersion solutions B-1 to B-9, and physical properties of the dispersion solution B.

TABLE 1

| | | Material formulation | | | | | | Physical properties of dispersion solution | | |
|---|---|---|---|---|---|---|---|---|---|---|
| | | Organic acid | | Amine compound | | | | | | |
| Dispersion solution A | ATO Particle Type | Type | Content (parts by mass) | Type | Molecular weight | Content (parts by mass) | Dispersion medium | ATO concentration (mass %) | Particle diameter (nm) | Polydispersity index |
| Dispersion solution A-1 | ATO Particle A | Acetic acid | 0.20 | TOA | 353.7 | 0.05 | IPA | 20.0 | 167.5 | 0.281 |
| Dispersion solution A-2 | ATO Particle A | Acetic acid | 0.20 | DIA | 101.2 | 0.01 | IPA | 20.0 | 348.1 | 0.391 |

TABLE 1-continued

| | | Material formulation | | | | | | Physical properties of dispersion solution | | |
|---|---|---|---|---|---|---|---|---|---|---|
| | | Organic acid | | Amine compound | | | | | | |
| Dispersion solution A | ATO Particle Type | Type | Content (parts by mass) | Type | Molecular weight | Content (parts by mass) | Dispersion medium | ATO concentration (mass %) | Particle diameter (nm) | Polydispersity index |
| Dispersion solution A-3 | ATO Particle A | Acetic acid | 0.20 | TBA | 185.4 | 0.02 | IPA | 20.0 | 274.7 | 0.358 |
| Dispersion solution A-4 | ATO Particle A | Acetic acid | 0.20 | TUA | 479.9 | 0.06 | IPA | 20.0 | 142.7 | 0.266 |
| Dispersion solution A-5 | ATO Particle A | None | — | TOA | 353.7 | 0.05 | IPA | 20.0 | 247.4 | 0.332 |
| Dispersion solution A-6 | ATO Particle A | Acetic acid | 0.20 | None | — | — | IPA | 20.0 | 2296.9 | 1.505 |

In Table 1, ATO particle A indicates antimony-containing tin oxide not treated with a silane coupling agent, TOA indicates tri-n-octylamine (commercially available from Kishida Chemical Co., Ltd.), DIA indicates diisopropylamine (commercially available from Kishida Chemical Co., Ltd.), TBA indicates tri-n-butylamine (commercially available from Kishida Chemical Co., Ltd.), TUA indicates tri-n-undecylamine (commercially available from Tokyo Chemical Industry Co., Ltd.), IPA indicates isopropyl alcohol, the content is the content (parts by mass) with respect to 100 parts by mass of the dispersion solution, and the particle diameter indicates a cumulant average particle diameter (nm).

indicates tri-n-undecylamine (commercially available from Tokyo Chemical Industry Co., Ltd.), MEK indicates methyl ethyl ketone, the content is the content (parts by mass) with respect to 100 parts by mass of the dispersion solution, and the particle diameter indicates a cumulant average particle diameter (nm).

Example 1

Preparation of Dispersion Solution 1

37.5 g of the dispersion solution A-1 was weighed out, and 6.25 g of the dispersion solution B-1 was added dropwise while stirring the dispersion solution A-1 using a

TABLE 2

| | Material formulation | | | | | | | | | Physical properties of dispersion solution | | |
|---|---|---|---|---|---|---|---|---|---|---|---|---|
| | ATO Particle | | Organic acid | | | Amine compound | | | | | | |
| Dispersion solution B | Type | Surface treatment rate (parts by mass) | Type | Molecular weight | Content (parts by mass) | Type | Molecular weight | Content (parts by mass) | Dispersion medium | ATO concentration (mass %) | Particle diameter (nm) | Polydispersity index |
| Dispersion solution B-1 | ATO Particle B | 30.0 | Phosphorus compound 1 | About 1500 | 1.60 | TOA | 353.7 | 0.30 | MEK | 40 | 299.1 | 0.305 |
| Dispersion solution B-2 | ATO Particle B | 10.0 | Phosphorus compound 1 | About 1500 | 1.60 | TOA | 353.7 | 0.30 | MEK | 40 | 347.3 | 0.327 |
| Dispersion solution B-3 | ATO Particle B | 50.0 | Phosphorus compound 1 | About 1500 | 1.60 | TOA | 353.7 | 0.30 | MEK | 40 | 96.7 | 0.285 |
| Dispersion solution B-4 | ATO Particle B | 30.0 | Phosphorus compound 1 | About 1500 | 1.60 | DIA | 101.2 | 0.11 | MEK | 40 | 457.1 | 0.353 |
| Dispersion solution B-5 | ATO Particle B | 30.0 | Phosphorus compound 1 | About 1500 | 1.60 | TBA | 185.4 | 0.20 | MEK | 40 | 378.0 | 0.338 |
| Dispersion solution B-6 | ATO Particle B | 30.0 | Phosphorus compound 1 | About 1500 | 1.60 | TUA | 479.9 | 0.51 | MEK | 40 | 242.9 | 0.301 |
| Dispersion solution B-7 | ATO Particle B | 30.0 | Phosphorus compound 2 | 398.48 | 0.42 | TOA | 353.7 | 0.37 | MEK | 40 | 497.1 | 0.362 |
| Dispersion solution B-8 | ATO Particle B | 30.0 | Phosphorus compound 1 | About 1500 | 1.60 | None | — | — | MEK | 40 | Measurement was not possible | Measurement was not possible |
| Dispersion solution B-9 | ATO Particle B | 30.0 | None | — | — | TOA | 353.7 | 0.37 | MEK | 40 | 5352.8 | 0.917 |

In Table 2, ATO particle B indicates antimony-containing tin oxide that has been subjected to a silane coupling treatment, TOA indicates tri-n-octylamine (commercially available from Kishida Chemical Co., Ltd.), DIA indicates diisopropylamine (commercially available from Kishida Chemical Co., Ltd.), TBA indicates tri-n-butylamine (commercially available from Kishida Chemical Co., Ltd.), TUA magnetic stirrer. Then, the mixture was stirred for 30 minutes to obtain a dispersion solution 1. In the dispersion solution 1, the ATO concentration in the dispersion solution was 22.9 mass %, the content of the ATO particle A in the tin oxide particle was 25 mass %, and the content of the ATO particle B in the tin oxide particle was 75 mass %.

The average particle diameter of tin oxide particle in the dispersion solution 1 was measured to be 222.0 nm, and the polydispersity index was 0.315.

Preparation of Resin Film-Forming Coating Material Containing Dispersion Solution 1

2.152 g of the dispersion solution 1 was weighed out, and the dispersion solution 1 was mixed with 2.013 g of pentaerythritol and tetraacrylate (product name: ARONIX M-306, commercially available from Toagosei Co., Ltd.), 0.15 g of a photopolymerization initiator (product name: Omnirad 907, commercially available from IGMResins), 0.004 g of a leveling agent (product name: Symac US-270, commercially available from Toagosei Co., Ltd.), and 1.216 g of methyl ethyl ketone (commercially available from Kishida Chemical Co., Ltd.), and the mixture was stirred to obtain a resin film-forming coating material 1. The ATO concentration of the coating material 1 with respect to 100 parts by mass of the binder resin was 24.6 parts by mass.

In the present disclosure, pentaerythritol tri- and tetraacrylate refers to a mixture of pentaerythritol triacrylate and pentaerythritol tetraacrylate.

Production of Resin Film Containing Cured Product of Coating Film of Resin Film-Forming Coating Material 1

The resin film-forming coating material 1 was applied onto a PEN film (Teonex Q51, commercially available from Toyobo Co., Ltd.) by bar coating using a No. 16 wire bar. Then, the sample was dried in a 23° C. environment under exhaust air for 1 minute. Then, the coating film was irradiated with ultraviolet rays using a UV irradiator (product name: UE06/81-3, commercially available from Eye Graphics Co., Ltd.) until the cumulative light amount reached 600 mJ/cm$^2$, and the coating film was cured to produce a PEN film 1 having a resin film 1 on its surface.

The measurement result of the surface resistivity of the obtained PEN film 1 was 9.41 (LOG Ω/□). The surface roughness was 0.0042 μm, and the thickness of the resin film was 2.81 m.

Example 2

Preparation of Dispersion Solution 2

25.00 g of the dispersion solution A-1 was weighed out, and 12.50 g of the dispersion solution B-1 was added dropwise while stirring the dispersion solution A-1 using a magnetic stirrer. Then, the mixture was stirred for 30 minutes to obtain a dispersion solution 2. In the dispersion solution 2, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 2 was measured to be 162.5 nm, and the polydispersity index was 0.290.

Preparation of Resin Film-Forming Coating Material Containing Dispersion Solution 2

A resin film-forming coating material 2 was obtained in the same manner as in Example 1 except that the dispersion solution 1 was changed to 1.833 g of the dispersion solution 2, and the amount of methyl ethyl ketone was changed to 1.527 g. The ATO concentration of the coating material 2 with respect to 100 parts by mass of the binder resin was 24.6 parts by mass.

Production of Resin Film Containing Cured Product of Coating Film of Resin Film-Forming Coating Material 2

A PEN film 2 having a resin film 2 on its surface was produced in the same manner as in Example 1 except that the resin film-forming coating material 2 was used.

The measurement result of the surface resistivity of the obtained PEN film 2 was 10.04 (LOG Ω/□). The surface roughness was 0.0035 m, and the thickness of the resin film was 2.98 m.

Example 3

Preparation of Dispersion Solution 3

12.5 g of the dispersion solution A-1 was weighed out, and 21.0 g of the dispersion solution B-1 was added dropwise while stirring the dispersion solution A-1 using a magnetic stirrer. Then, the mixture was stirred for 30 minutes to obtain a dispersion solution 3. In the dispersion solution 3, the ATO concentration in the dispersion solution was 32.5 mass %, the content of the ATO particle A in the tin oxide particle was 25 mass %, and the content of the ATO particle B in the tin oxide particle was 75 mass %.

The average particle diameter of tin oxide particle in the dispersion solution 3 was measured to be 239.9 nm, and the polydispersity index was 0.278.

Preparation of Resin Film-Forming Coating Material Containing Dispersion Solution 3

A resin film-forming coating material 3 was obtained in the same manner as in Example 1 except that the dispersion solution 1 was changed to 1.650 g of the dispersion solution 3, and the amount of methyl ethyl ketone was changed to 1.686 g. The ATO concentration of the coating material 3 with respect to 100 parts by mass of the binder resin was 24.6 parts by mass.

(Production of Resin Film Containing Cured Product of Coating Film of Resin Film-Forming Coating Material 3)

A PEN film 3 having a resin film 3 on its surface was produced in the same manner as in Example 1 except that the resin film-forming coating material 3 was used.

The measurement result of the surface resistivity of the obtained PEN film 3 was 10.44 (LOG Ω/□). The surface roughness was 0.0023 μm, and the thickness of the resin film was 2.83 km.

Example 4

Preparation of Dispersion Solution 4

25.0 g of the dispersion solution A-1 was weighed out, and 12.5 g of the dispersion solution B-2 was added dropwise while stirring the dispersion solution A-1 using a magnetic stirrer. Then, the mixture was stirred for 30 minutes to obtain a dispersion solution 4. In the dispersion solution 4, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 4 was measured to be 295.6 nm, and the polydispersity index was 0.345.

Preparation of Resin Film-Forming Coating Material Containing Dispersion Solution 4

A resin film-forming coating material 4 was obtained in the same manner as in Example 2 except that the dispersion solution 4 was used in place of the dispersion solution 2. The ATO concentration of the coating material 4 with respect to 100 parts by mass of the binder resin was 24.6 parts by mass.

Production of Resin Film Containing Cured Product of Coating Film of Resin Film-Forming Coating Material 4

A PEN film 4 having a resin film 4 on its surface was produced in the same manner as in Example 1 except that the resin film-forming coating material 4 was used.

The measurement result of the surface resistivity of the obtained PEN film 4 was 9.81 (LOG Ω/□). The surface roughness was 0.0037 m, and the thickness of the resin film was 2.96 m.

Example 5

Preparation of Dispersion Solution 5

25.0 g of the dispersion solution A-1 was weighed out, and 12.5 g of the dispersion solution B-3 was added dropwise while stirring the dispersion solution A-1 using a magnetic stirrer. Then, the mixture was stirred for 30 minutes to obtain a dispersion solution 5. In the dispersion solution 5, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 5 was measured to be 97.9 nm, and the polydispersity index was 0.277.

Preparation of Resin Film-Forming Coating Material Containing Dispersion Solution 5

A resin film-forming coating material 5 was obtained in the same manner as in Example 2 except that the dispersion solution 5 was used in place of the dispersion solution 2. The ATO concentration of the coating material 5 with respect to 100 parts by mass of the binder resin was 24.6 parts by mass.

Production of Resin Film Containing Cured Product of Coating Film of Resin Film-Forming Coating Material 5

A PEN film 5 having a resin film 5 on its surface was produced in the same manner as in Example 1 except that the resin film-forming coating material 5 was used.

The measurement result of the surface resistivity of the obtained PEN film 5 was 10.14 (LOG Ω/□). The surface roughness was 0.0029 m, and the thickness of the resin film was 2.84 m.

Example 6

Preparation of Dispersion Solution 6

25.0 g of the dispersion solution A-2 was weighed out, and 12.5 g of the dispersion solution B-4 was added dropwise while stirring the dispersion solution A-2 using a magnetic stirrer. Then, the mixture was stirred for 30 minutes to obtain a dispersion solution 6. In the dispersion solution 6, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 6 was measured to be 363.1 nm, and the polydispersity index was 0.349.

Preparation of Resin Film-Forming Coating Material Containing Dispersion Solution 6

A resin film-forming coating material 6 was obtained in the same manner as in Example 2 except that the dispersion solution 6 was used in place of the dispersion solution 2. The ATO concentration of the coating material 6 with respect to 100 parts by mass of the binder resin was 24.6 parts by mass.

Production of Resin Film Containing Cured Product of Coating Film of Resin Film-Forming Coating Material 6

A PEN film 6 having a resin film 6 on its surface was produced in the same manner as in Example 1 except that the resin film-forming coating material 6 was used.

The measurement result of the surface resistivity of the obtained PEN film 6 was 9.76 (LOG Ω/□). The surface roughness was 0.0041 m, and the thickness of the resin film was 2.65 m.

Example 7

Preparation of Dispersion Solution 7

25.0 g of the dispersion solution A-3 was weighed out, and 12.5 g of the dispersion solution B-5 was added dropwise while stirring the dispersion solution A-3 using a magnetic stirrer. Then, the mixture was stirred for 30 minutes to obtain a dispersion solution 7. In the dispersion solution 7, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 7 was measured to be 346.8 nm, and the polydispersity index was 0.286.

Preparation of Resin Film-Forming Coating Material Containing Dispersion Solution 7

A resin film-forming coating material 7 was obtained in the same manner as in Example 2 except that the dispersion solution 7 was used in place of the dispersion solution 2. The ATO concentration of the coating material 7 with respect to 100 parts by mass of the binder resin was 24.6 parts by mass.

Production of Resin Film Containing Cured Product of Coating Film of Resin Film-Forming Coating Material 7

The resin film-forming coating material 7 was applied onto a PEN film (Teonex Q51, commercially available from Toyobo Co., Ltd.) by bar coating using a No. 16 wire bar. Then, the sample was dried in a 23° C. environment under exhaust air for 1 minute. Then, the coating film was irradiated with ultraviolet rays using a UV irradiator (product name: UE06/81-3, commercially available from Eye Graphics Co., Ltd.) until the cumulative light amount reached 600 mJ/cm2, and the coating film was cured and used, except for this, in the same manner as in Example 1, a PEN film 7 having a resin film 7 on its surface was produced.

The measurement result of the surface resistivity of the obtained PEN film 7 was 9.83 (LOG Ω/□). The surface roughness was 0.0037 m, and the thickness of the resin film was 2.98 m.

Example 8

Preparation of Dispersion Solution 8

25.0 g of the dispersion solution A-4 was weighed out, and 12.5 g of the dispersion solution B-6 was added dropwise while stirring the dispersion solution A-4 using a magnetic stirrer. Then, the mixture was stirred for 30 minutes to obtain a dispersion solution 8. In the dispersion solution 8, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 8 was measured to be 212.8 nm, and the polydispersity index was 0.291.

Preparation of Resin Film-Forming Coating Material Containing Dispersion Solution 8

A resin film-forming coating material 8 was obtained in the same manner as in Example 2 except that the dispersion solution 8 was used in place of the dispersion solution 2. The ATO concentration of the coating material 8 with respect to 100 parts by mass of the binder resin was 24.6 parts by mass.

Production of Resin Film Containing Cured Product of Coating Film of Resin Film-Forming Coating Material 8

A PEN film 8 having a resin film 8 on its surface was produced in the same manner as in Example 1 except that the resin film-forming coating material 8 was used.

The measurement result of the surface resistivity of the obtained PEN film 8 was 10.16 (LOG Ω/□). The surface roughness was 0.0026 m, and the thickness of the resin film was 2.96 m.

Example 9

Preparation of Dispersion Solution 9

25.0 g of the dispersion solution A-1 was weighed out, and 12.5 g of the dispersion solution B-7 was added dropwise while stirring the dispersion solution A-1 using a magnetic stirrer. Then, the mixture was stirred for 30 minutes to obtain a dispersion solution 9. In the dispersion solution 9, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 9 was measured to be 391.2 nm, and the polydispersity index was 0.335.

Preparation of Resin Film-Forming Coating Material Containing Dispersion Solution 9

A resin film-forming coating material 9 was obtained in the same manner as in Example 2 except that the dispersion solution 9 was used in place of the dispersion solution 2. The ATO concentration of the coating material 9 with respect to 100 parts by mass of the binder resin was 24.6 parts by mass.

Production of Resin Film Containing Cured Product of Coating Film of Resin Film-Forming Coating Material 9

A PEN film 9 having a resin film 9 on its surface was produced in the same manner as in Example 1 except that the resin film-forming coating material 9 was used.

The measurement result of the surface resistivity of the obtained PEN film 9 was 9.23 (LOG Ω/□). The surface roughness was 0.0048 am, and the thickness of the resin film was 2.86 μm.

Example 10

Preparation of Resin Film-Forming Coating Material Containing Dispersion Solution 2

A resin film-forming coating material 10 was obtained in the same manner as in Example 2 except that the amount of the dispersion solution 2 was changed to 2.601 g, and the amount of methyl ethyl ketone was changed to 1.447 g. The ATO concentration of the coating material 10 was 35.0 parts by mass with respect to the acrylic resin binder.

Production of Resin Film Containing Cured Product of Coating Film of Resin Film-Forming Coating Material 10

A PEN film 10 having a resin film 10 on its surface was produced in the same manner as in Example 1 except that the resin film-forming coating material 10 was used.

The measurement result of the surface resistivity of the obtained PEN film 10 was 9.16 (LOG Ω/□). The surface roughness was 0.0045 m, and the thickness of the resin film was 2.86 m.

Example 11

Preparation of Resin Film-Forming Coating Material Containing Dispersion Solution 2

A resin film-forming coating material 11 was obtained in the same manner as in Example 2 except that the amount of the dispersion solution 2 was changed to 3.727 g, and the amount of methyl ethyl ketone was changed to 1.359 g. The ATO concentration of the coating material 11 was 50 parts by mass with respect to the acrylic resin binder.

Production of Resin Film Containing Cured Product of Coating Film of Resin Film-Forming Coating Material 11

A PEN film 11 having a resin film 11 on its surface was produced in the same manner as in Example 1 except that the resin film-forming coating material 11 was used.

The measurement result of the surface resistivity of the obtained PEN film 11 was 8.62 (LOG Ω/□). The surface roughness was 0.0049 m, and the thickness of the resin film was 2.61 m.

Example 12

A method of preparing an electrophotographic intermediate transfer belt using a coating material 2 will be described.

Preparation of Surface Layer Coating Material 64.53 g of the dispersion solution 2 was weighed out, the dispersion solution 2 was mixed with 259.1 g of a resin solution composed of the following materials, and the mixture was stirred to obtain a surface layer coating material 1 for an intermediate transfer belt.

The resin solution was prepared by the following procedure. 88.83 g of pentaerythritol and tetraacrylate (product name: ARONIX M-305, commercially available from Toagosei Co., Ltd.), 6.75 g of a photopolymerization initiator (product name: Omnirad907, commercially available from IGMResins), 0.19 g of a leveling agent (product name: Symac US-270, commercially available from Toagosei Co., Ltd.), 62.2 g of methyl ethyl ketone (commercially available from Kishida Chemical Co., Ltd.), 14.4 g of polytetrafluoroethylene particles (hereinafter referred to as PTFE) (Lubron L-2, commercially available from Daikin Industries, Ltd.) as a lubricant, 3.50 g of a dispersing agent for PTFE particles (product name: Aron GF-400, commercially available from Toagosei Co., Ltd.), and 119.2 g of methyl isobutyl ketone (MIBK) were weighed out and mixed. Then, the obtained mixture was roughly dispersed using a homogenizer, and the resulting solution was dispersed using a high-pressure emulsifying disperser (product name: Nano-Vater, commercially available from Yoshida Kikai Co., Ltd.) to prepare a resin solution.

Formation of Base Layer of Electrophotographic Intermediate Transfer Belt

A base layer was formed using the following raw materials.

- Polyethylene naphthalate (product name: Teonex TN8050SC, commercially available from Teijin Ltd.) (hereinafter referred to as "PE(1)") as a polyester resin.
- Polyether ester amide (product name: TPAE-10HP-10, commercially available from T&K TOKA Corporation) (hereinafter referred to as "PEEA") as a conducting agent.
- Potassium perfluorobutane sulfonate (product name: EFTOP KFBS, commercially available from Mitsubishi Materials Electronic Chemicals Co., Ltd.) (hereinafter referred to as "KFBS").

The above PE(1), PEEA and KFBS were mixed in a ratio of PE(1)/PEEA/KFBS=80/18/2 (mass %). Then, the mixture was melted and kneaded using a twin screw extruder (product name: TEX30α, commercially available from The Japan Steel Works, Ltd.), at 290° C. for 5 minutes to obtain a resin mixture composed of PE(1), PEEA and KFBS. The obtained resin mixture was pelletized using a cutter (product name: fan cutter, commercially available from Hoshi Plastics Co., Ltd.) to obtain resin mixture pellets (pellet size: long diameter 3 mm×short diameter 2 mm). The obtained pellets were dried at 140° C. for 6 hours.

Next, the dried resin mixture pellets were put into a hopper of an injection molding machine (product name: SE180D, commercially available from Sumitomo Heavy Industries). Then, the cylinder temperature was set to 290° C., the sample was melted under screw stirring and injection-molded into a mold to produce a preform having a test tube shape. The obtained preform was put into a blow molding machine and blow-molded in a blow mold kept at a mold temperature of 110° C. using the force of a stretch rod and air at a preform temperature of 155° C., an air pressure of 0.3 MPa, and a stretch rod speed of 1,000 mm/s to obtain a blow bottle. Both ends of this blow bottle were cut out, and thus a base layer having an endless belt shape with a length of 712 mm in the circumferential direction and a length (width) of 244 mm in the direction perpendicular to the circumferential direction was cut out. The thickness of the base layer was 70 μm.

Formation of Surface Layer

The base layer obtained by blow molding was fitted onto the outer periphery of the cylindrical mold, the ends were sealed, and the mold was then immersed in a container filled with the produced surface layer coating material 1, and lifted so that the relative speed between the liquid surface of the curable composition and the base layer was constant, and thus a coating film of the surface layer coating material 1 was formed on the surface of the base layer. According to the desired film thickness, the lifting speed (the relative speed between the liquid surface of the curable composition and the base layer) and the solvent proportion of the surface coating material could be adjusted.

In this example, the lifting speed was set to 10 to 50 mm/sec, and the film thickness of the surface layer was adjusted to 3 μm. The coating film was formed and then dried in a 23° C. environment under exhaust air for 1 minute. The drying temperature and the drying time were appropriately adjusted depending on the type of solvent, the solvent proportion, and the film thickness. Then, the coating film was irradiated with ultraviolet rays using a UV irradiator (product name: UE06/81-3, commercially available from Eye Graphics Co., Ltd.) until the cumulative light amount reached 600 mJ/cm$^2$, and the coating film was cured to form a surface layer. Thereby, an electrophotographic intermediate transfer belt 1 having an endless shape was obtained. The measurement result of the surface resistivity of the intermediate transfer belt 1 was 9.94 (LOG Ω/□). The surface roughness was 0.0039 μm, and the thickness of the resin film was 3.11 μm.

Comparative Example 1

Preparation of Resin Film-Forming Coating Material Containing Dispersion Solution A-1

A resin film-forming coating material 12 was obtained in the same manner as in Example 1 except that the dispersion solution 1 was changed to 2.475 g of the dispersion solution A-1, and the amount of methyl ethyl ketone was changed to 0.892 g. The ATO concentration of the coating material 12 with respect to 100 parts by mass of the binder resin was 24.6 parts by mass.

Production of Resin Film Containing Cured Product of Coating Film of Resin Film-Forming Coating Material 12

A PEN film 12 having a resin film 12 on its surface was produced in the same manner as in Example 1 except that the resin film-forming coating material 12 was used.

The measurement result of the surface resistivity of the obtained PEN film 12 was 8.61 (LOG Ω/□). The surface roughness was 0.1055 m, and the thickness of the resin film was 3.19 km.

Comparative Example 2

(Preparation of Resin Film-Forming Coating Material Containing Dispersion Solution B-1)

A resin film-forming coating material 13 was obtained in the same manner as in Example 1 except that the dispersion solution 1 was changed to 1.238 g of the dispersion solution B-1, and the amount of methyl ethyl ketone was changed to 2.122 g. The ATO concentration of the coating material 13 with respect to 100 parts by mass of the binder resin was 24.6 parts by mass.

Production of Resin Film Containing Cured Product of Coating Film of Resin Film-Forming Coating Material 13

A PEN film 13 having a resin film 13 on its surface was produced in the same manner as in Example 1 except that the resin film-forming coating material 13 was used.

The measurement result of the surface resistivity of the obtained PEN film 13 was 12.05 (LOG Ω/□). The surface roughness was 0.0280 m, and the thickness of the resin film was 2.50 km.

Comparative Example 3

Preparation of Dispersion Solution 12

25.0 g of the dispersion solution A-5 was weighed out, and 12.5 g of the dispersion solution B-1 was added dropwise while stirring the dispersion solution A-5 using a magnetic stirrer. Then, the mixture was stirred for 30 minutes to obtain a dispersion solution 12. In the dispersion solution 12, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 12 was measured to be 301.2 nm, and the polydispersity index was 0.325.

Preparation of Resin Film-Forming Coating Material Containing Dispersion Solution 12

A resin film-forming coating material 14 was obtained in the same manner as in Example 1 except that the dispersion solution 12 was used in place of the dispersion solution 1. The ATO concentration of the coating material 14 with respect to 100 parts by mass of the binder resin was 24.6 parts by mass.

Production of Resin Film Containing Cured Product of Coating Film of Resin Film-Forming Coating Material 14

A PEN film 14 having a resin film 14 on its surface was produced in the same manner as in Example 1 except that the resin film-forming coating material 14 was used.

The measurement result of the surface resistivity of the obtained PEN film 14 was 11.91 (LOG Ω/□). The surface roughness was 0.0033 m, and the thickness of the resin film was 2.91 m.

Comparative Example 4

Preparation of Dispersion Solution 13

25.0 g of the dispersion solution A-6 was weighed out, and 12.5 g of the dispersion solution B-8 was added dropwise while stirring the dispersion solution A-6 using a magnetic stirrer. Then, the mixture was stirred for 30 minutes to obtain a dispersion solution 13. In the dispersion solution 13, the ATO concentration in the dispersion solution was 26.7 mass %, the content of the ATO particle A in the tin oxide particle was 50 mass %, and the content of the ATO particle B in the tin oxide particle was 50 mass %.

Measurement of the average particle diameter of tin oxide particle in the dispersion solution 13 was attempted, but the ATO particle aggregated in the dispersion solution, and the particle diameter exceeded the measurement limit and could not be measured. Therefore, for the dispersion solution 13, coating material preparation and resin film preparation were not performed.

Comparative Example 5

Preparation of Dispersion Solution 14

25.0 g of the dispersion solution A-1 was weighed out, and 12.5 g of the dispersion solution B-9 was added dropwise while stirring the dispersion solution A-1 using a magnetic stirrer. Then, the mixture was stirred for 30 minutes to obtain a dispersion solution 14. In the dispersion solution 14, the ATO concentration in the dispersion solution was 26.7 mass %, the content of the ATO particle A in the tin oxide particle was 50 mass %, and the content of the ATO particle B in the tin oxide particle was 50 mass %.

The average particle diameter of tin oxide particle in the dispersion solution 14 was measured to be 4916.2 nm, and the polydispersity index was 0.917.

Preparation of Resin Film-Forming Coating Material Containing Dispersion Solution 14

A resin film-forming coating material 15 was obtained in the same manner as in Example 1 except that the dispersion solution 14 was used in place of the dispersion solution 1. The ATO concentration of the coating material 15 with respect to 100 parts by mass of the binder resin was 24.6 parts by mass.

Production of Resin Film Containing Cured Product of Coating Film of Resin Film-Forming Coating Material 15

A PEN film 15 having a resin film 15 on its surface was produced in the same manner as in Example 1 except that the resin film-forming coating material 15 was used.

The surface resistivity of the obtained PEN film 15 was measured, and as a result, it changed the lower limit of the measurement device and could not be measured. The surface roughness was 0.3880 m, and the thickness of the resin film was 2.77 m.

Comparative Example 6

A surface layer coating material for an intermediate transfer belt 2 was prepared in the same method as in Example 12 except that the dispersion solution A-1 was used in place of the dispersion solution 2. Using this coating material, the intermediate transfer belt 2 was produced in the same method as in Example 12. The measurement result of the surface resistivity of the intermediate transfer belt 2 was 8.84 (LOG Ω/□). The surface roughness was 0.1214 m, and the thickness of the resin film was 3.15 m.

Comparative Example 7

A surface layer coating material for an intermediate transfer belt 3 was prepared in the same method as in Example 12 except that the dispersion solution B-1 was used in place of the dispersion solution 2, and using this coating material, the intermediate transfer belt 3 was produced in the same method as in Example 12. The measurement result of the surface resistivity of the intermediate transfer belt 3 was 12.55 (LOG Ω/□). The surface roughness was 0.0034 am, and the thickness of the resin film was 3.16 µm.

TABLE 3

| | | Material formulation | | | | | Physical properties | | Proportion of elemental |
|---|---|---|---|---|---|---|---|---|---|
| | Dispersion solution | Dispersion solution A | Dispersion solution B | ATO concentration mass % | ATO particle A proportion % | ATO particle B proportion % | Particle diameter (nm) | Polydispersity index | silicon in ATO particle B (mass %) |
| Example 1 | Dispersion solution 1 | Dispersion solution A-1 | Dispersion solution B-1 | 22.9 | 25 | 75 | 222.0 | 0.315 | 10.4 |
| Example 2 | Dispersion solution 2 | Dispersion solution A-1 | Dispersion solution B-1 | 26.7 | 50 | 50 | 162.5 | 0.290 | 7.6 |
| Example 3 | Dispersion solution 3 | Dispersion solution A-1 | Dispersion solution B-1 | 32.5 | 75 | 25 | 239.9 | 0.278 | 5.4 |
| Example 4 | Dispersion solution 4 | Dispersion solution A-1 | Dispersion solution B-2 | 26.7 | 50 | 50 | 295.6 | 0.345 | 5.2 |
| Example 5 | Dispersion solution 5 | Dispersion solution A-1 | Dispersion solution B-3 | 26.7 | 50 | 50 | 97.9 | 0.277 | 11.5 |
| Example 6 | Dispersion solution 6 | Dispersion solution A-2 | Dispersion solution B-4 | 26.7 | 50 | 50 | 363.1 | 0.349 | 7.6 |
| Example 7 | Dispersion solution 7 | Dispersion solution A-3 | Dispersion solution B-5 | 26.7 | 50 | 50 | 346.8 | 0.286 | 7.2 |
| Example 8 | Dispersion solution 8 | Dispersion solution A-4 | Dispersion solution B-6 | 26.7 | 50 | 50 | 212.8 | 0.291 | 7.2 |
| Example 9 | Dispersion solution 9 | Dispersion solution A-1 | Dispersion solution B-7 | 26.7 | 50 | 50 | 391.2 | 0.335 | 7.4 |

TABLE 3-continued

| | Dispersion solution | Dispersion solution A | Dispersion solution B | ATO concentration mass % | ATO particle A proportion % | ATO particle B proportion % | Particle diameter (nm) | Poly-dispersity index | Proportion of elemental silicon in ATO particle B (mass %) |
|---|---|---|---|---|---|---|---|---|---|
| Comparative Example 1 | Dispersion solution A-1 | Dispersion solution A-1 | None | 20.0 | 100 | 0 | 167.5 | 0.281 | — |
| Comparative Example 2 | Dispersion solution B-1 | None | Dispersion solution B-1 | 40.0 | 0 | 100 | 299.1 | 0.305 | 20.2 |
| Comparative Example 3 | Dispersion solution 12 | Dispersion solution A-5 | Dispersion solution B-1 | 26.7 | 50 | 50 | 301.2 | 0.325 | 7.1 |
| Comparative Example 4 | Dispersion solution 13 | Dispersion solution A-6 | Dispersion solution B-8 | 26.7 | 50 | 50 | Measurement was not possible | Measurement was not possible | — |
| Comparative Example 5 | Dispersion solution 14 | Dispersion solution A-1 | Dispersion solution B-9 | 26.7 | 50 | 50 | 4916.2 | 0.917 | 7.0 |

In Table 3, the ATO particle A indicates antimony-containing tin oxide particle A not treated with a silane coupling agent, the ATO particle B indicates antimony containing tin oxide particle B that have been subjected to a silane coupling treatment, the ATO concentration (mass %) indicates a total content of the ATO particle A and the ATO particle B in the conductive dispersion solution, the ATO particle A (proportion %) indicates the content of the ATO particle A (parts by mass) with respect to a total mass of 100 parts by mass of the ATO particle A and the ATO particle B in the conductive dispersion solution, the ATO particle B (proportion %) indicates the content (parts by mass) of the ATO particle B with respect to a total mass of 100 parts by mass of the ATO particle A and the ATO particle B in the conductive dispersion solution, the proportion (mass %) of elemental silicon in the ATO particle B indicates a proportion (mass %) of elemental silicon in all elements measured when the ATO particle B were measured through X-ray fluorescence, and the particle diameter indicates a cumulant average particle diameter (nm).

TABLE 4

| | Coating material | Dispersion solution | Dispersion solution A Type | Dispersion solution B Type | ATO Particle A Proportion % | ATO Particle B Proportion % | ATO content Parts by mass | Surface resistivity Ω/□ | Surface roughness μm | Thickness μm |
|---|---|---|---|---|---|---|---|---|---|---|
| Example 1 | Coating material 1 | Dispersion solution 1 | Dispersion solution A-1 | Dispersion solution B-1 | 25 | 75 | 24.6 | 9.4 | 0.0042 | 2.81 |
| Example 2 | Coating material 2 | Dispersion solution 2 | Dispersion solution A-1 | Dispersion solution B-1 | 50 | 50 | 24.6 | 10.0 | 0.0035 | 2.98 |
| Example 3 | Coating material 3 | Dispersion solution 3 | Dispersion solution A-1 | Dispersion solution B-1 | 75 | 25 | 24.6 | 10.4 | 0.0023 | 2.83 |
| Example 4 | Coating material 4 | Dispersion solution 4 | Dispersion solution A-1 | Dispersion solution B-2 | 50 | 50 | 24.6 | 9.8 | 0.0037 | 2.96 |
| Example 5 | Coating material 5 | Dispersion solution 5 | Dispersion solution A-1 | Dispersion solution B-3 | 50 | 50 | 24.6 | 10.1 | 0.0029 | 2.84 |
| Example 6 | Coating material 6 | Dispersion solution 6 | Dispersion solution A-2 | Dispersion solution B-4 | 50 | 50 | 24.6 | 9.8 | 0.0041 | 2.65 |
| Example 7 | Coating material 7 | Dispersion solution 7 | Dispersion solution A-3 | Dispersion solution B-5 | 50 | 50 | 24.6 | 9.8 | 0.0037 | 2.98 |
| Example 8 | Coating material 8 | Dispersion solution 8 | Dispersion solution A-4 | Dispersion solution B-6 | 50 | 50 | 24.6 | 10.2 | 0.0026 | 2.96 |
| Example 9 | Coating material 9 | Dispersion solution 9 | Dispersion solution A-1 | Dispersion solution B-7 | 50 | 50 | 24.6 | 9.2 | 0.0048 | 2.86 |
| Example 10 | Coating material 10 | Dispersion solution 2 | Dispersion solution A-1 | Dispersion solution B-1 | 50 | 50 | 35.0 | 9.2 | 0.0045 | 2.86 |
| Example 11 | Coating material 11 | Dispersion solution 2 | Dispersion solution A-1 | Dispersion solution B-1 | 50 | 50 | 50.0 | 8.6 | 0.0049 | 2.61 |
| Example 12 | Surface layer coating material 1 | Dispersion solution 2 | Dispersion solution A-1 | Dispersion solution B-1 | 50 | 50 | 20.0 | 9.9 | 0.0039 | 3.11 |
| Comparative Example 1 | Coating material 12 | Dispersion solution A-1 | Dispersion solution A-1 | — | 100 | 0 | 24.6 | 8.6 | 0.1055 | 3.19 |
| Comparative Example 2 | Coating material 13 | Dispersion solution B-1 | — | Dispersion solution B-1 | 100 | 0 | 24.6 | 12.1 | 0.0280 | 2.50 |

TABLE 4-continued

| | | Dispersion solution Material formulation | | | | In coating | Physical properties of resin film | | |
|---|---|---|---|---|---|---|---|---|---|
| | | | | ATO Particle A Proportion % | ATO Particle B Proportion % | ATO content Parts by mass | Surface resistivity Ω/□ | Surface roughness μm | Thickness μm |
| | Coating material | Dispersion solution | Dispersion solution A Type | Dispersion solution B Type | | | | | |
| Comparative Example 3 | Coating material 14 | Dispersion solution 12 | Dispersion solution A-5 | Dispersion solution B-1 | 50 | 50 | 24.6 | 11.9 | 0.0033 | 2.91 |
| Comparative Example 5 | Coating material 15 | Dispersion solution 14 | Dispersion solution A-1 | Dispersion solution B-9 | 50 | 50 | 24.6 | U | 0.3880 | 2.77 |
| Comparative Example 6 | Surface layer coating material 2 | Dispersion solution A-1 | Dispersion solution A-1 | — | 100 | 0 | 20.0 | 8.8 | 0.1214 | 3.15 |
| Comparative Example 7 | Surface layer coating material 3 | Dispersion solution B-1 | — | Dispersion solution B-1 | 100 | 0 | 20.0 | 12.6 | 0.0034 | 3.16 |

In Table 4, ATO particle A indicates antimony-containing tin oxide particle A not treated with a silane coupling agent, ATO particle B indicates antimony-containing tin oxide particle B that have been subjected to a silane coupling treatment, the ATO particle A (proportion %) indicates the content of the ATO particle A (parts by mass) with respect to a total mass of 100 parts by mass of the ATO particle A and the ATO particle B in the conductive dispersion solution, and the ATO particle B (proportion %) indicates the content (parts by mass) of the ATO particle B with respect to a total mass of 100 parts by mass of the ATO particle A and the ATO particle B in the conductive dispersion solution. In addition, the ATO content (parts by mass) indicates the content (parts by mass) of the ATO particle with respect to 100 parts by mass of the binder resin. In the surface resistivity section, U indicates that measurement was not possible. Here, Example 12, Comparative Example 6, and Comparative Example 7 show the results of preparing and evaluating electrophotographic intermediate transfer belts.

Evaluation Results

Hereinafter, the results of evaluating examples and comparative examples will be described.

In all of Examples 1 to 11, resin films having both high conductivity and favorable surface roughness were formed.

The conductive dispersion solution according to Comparative Example 1 was a dispersion solution in which the tin oxide particle included only ATO particle A, and the conductive dispersion solution according to Comparative Example 2 was a dispersion solution in which the tin oxide particle included only ATO particle B. When these solutions were used alone, it was confirmed that high conductivity and little surface roughness were in a trade-off relationship, and it was difficult to achieve both high conductivity and little surface roughness.

The conductive dispersion solution according to Comparative Example 3 was a dispersion solution containing no organic acid. It is generally known that ease of aggregation of ATO particle is affected by the pH of the dispersion medium. This is estimated to be because, since the isoelectric point of the zeta potential of the ATO particle is on the acidic side, when an organic acid is mixed in, the pH shifts to the acidic side in the process of drying the coating material, and the ATO particle aggregate. Therefore, when the dispersion solution contains no organic acid, an aggregation effect is less likely to occur in the ATO particle. Therefore, it is thought that no conductive path forms and the resistivity increases. This suggests that it is necessary for the conductive dispersion solution to contain an organic acid in order to impart conductivity.

The conductive dispersion solution according to Comparative Example 4 was a dispersion solution containing no amine compound. The amine compound was added in order to exhibit a dispersion effect when it adhered to the surface of the ATO particle. It was thought that, when the dispersion solution contained no amine compound, since a dispersion effect was less likely to act on the ATO particle, the dispersion solution was aggregated to such an extent that it was difficult to measure the particle diameter. This suggested that, in order to obtain the effect of the present disclosure, it was necessary for the conductive dispersion solution to contain an amine compound.

The conductive dispersion solution according to Comparative Example 5 was a dispersion solution containing no phosphorus compound. Like the amine compound, the phosphorus compound was added in order to exhibit a particle dispersion effect when it adhered to the surface of the ATO particle. As described above, the phosphorus compound had stronger adhesion to metal oxide particles than the amine compound. When the dispersion solution contained no phosphorus compound, since a dispersion effect was less likely to act on the ATO particle, the ATO particle tended to aggregate. This suggested that, in order to obtain the effect of the present disclosure, the phosphorus compound was necessary to improve the dispersibility of the ATO particle.

In Example 12, an intermediate transfer belt, which is an electrophotographic member, was prepared using the dispersion solution 2. The intermediate transfer belt had a surface resistivity (LOGρS) of 9.94Ω/□ and a surface roughness of 0.0039 μm, and had a surface layer film having appropriate resistivity and little surface roughness required for intermediate transfer.

On the other hand, in Comparative Example 6, a surface layer coating material for an intermediate transfer belt was prepared using the dispersion solution A-1. The intermediate transfer belt 2 prepared using this coating material had large surface roughness. As a result, there is concern of the toner cleaning blade sliding and wear or chipping occurring.

In addition, in Comparative Example 7, a surface layer coating material for an intermediate transfer belt was prepared using only the dispersion solution B-1. It was found that the intermediate transfer belt 3 prepared using this coating material had little surface roughness, but the surface resistivity was too large, and thus it was difficult to apply it to electrophotographic members.

In order to confirm the surface roughness reduction effect, the intermediate transfer belt 1 and the intermediate transfer belt 2 were evaluated as follows using the electrophotographic image forming apparatus having the configuration shown in FIG. 2. That is, the intermediate transfer belt was installed as an intermediate transfer member, blade cleaning was performed while printing images, and toner cleaning performance was evaluated.

This evaluation was performed in an environment of a temperature of 15° C. and a relative humidity of 10%, Extra (basis weight 80 g/m$^2$, commercially available from OCE) paper of JIS A4 size was used as the recoding medium S, the paper was passed through until a toner cleaning failure occurred according to intermittent printing of two sheets of paper, and it was determined whether the toner slipped from the cleaning blade 3l.

Specifically, when the secondary transfer voltage was turned off (0 V), laser light was emitted to the photosensitive drums 1y and 1m to record a red image (Y toner and M toner) over the entire surface of A4 size. Then, the secondary transfer voltage was set to an appropriate value, and three blank sheets of paper were passed continuously. Since the secondary transfer voltage was not applied, the Y toner and M toner transferred from the photosensitive drums 1y and 1m to the entire surface of the electrophotographic belt were hardly transferred to the recoding medium in the secondary transfer section, and entered the cleaning blade in the cleaning device. When the entered toner was removed from the electrophotographic belt, the next three sheets of paper that passed through were output as completely blank sheets of paper. On the other hand, if the toner was not removed, the transfer residual toner that had slipped through the cleaning blade was then transferred to the recoding medium in the secondary transfer section. That is, the transfer residual toner was transferred onto a blank sheet of paper and was output as a toner cleaning failure image on the recoding medium.

The above evaluation was performed when 100,000 sheets of paper were passed, when 200,000 sheets of paper were passed, when 300,000 sheets of paper were passed, and when 400,000 sheets of paper were passed.

When the intermediate transfer belt 1 was used, it was confirmed that no toner cleaning failure occurred when 400,000 sheets of paper were passed, and the electrophotographic belt had excellent durability.

On the other hand, it was found that, in the intermediate transfer belt 2, when 400,000 sheets of paper were passed, a toner cleaning failure occurred, and durability was inferior to that of the transfer belt 1. After the test using the intermediate transfer belt 2, when the vicinity of the part of the cleaning blade in contact with the electrophotographic belt was observed, it was confirmed that there was wear trace on the cleaning blade.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-101323, filed Jun. 24, 2024 which is hereby incorporated by reference herein in its entirety.

What is claimed is:

1. A conductive dispersion solution comprising a tin oxide particle and a dispersion medium, wherein
the conductive dispersion solution further comprises an organic acid, a phosphorus compound, and an amine compound,
the tin oxide particle is dispersed in the dispersion medium,
a cumulant average particle diameter of the tin oxide particle in the conductive dispersion solution is 90 to 400 nm,
the organic acid, the phosphorus compound, and the amine compound are dissolved in the dispersion medium, and
the tin oxide particle comprises an antimony-containing tin oxide particle A not treated with a silane coupling agent and an antimony-containing tin oxide particle B treated with a silane coupling agent.

2. The conductive dispersion solution according to claim 1, wherein
a proportion of a content of the tin oxide particle in the conductive dispersion solution is 5.0 to 50.0 mass %, and
a content of the antimony-containing tin oxide particle A in the conductive dispersion solution with respect to a total of 100 parts by mass of the antimony-containing tin oxide particle A and the antimony-containing tin oxide particle B is 25 to 75 parts by mass.

3. The conductive dispersion solution according to claim 1, wherein
when the antimony-containing tin oxide particle B comprised in the conductive dispersion solution is measured through X-ray fluorescence, a proportion of elemental silicon in all elements measured is 5.0 to 15.0 mass %.

4. The conductive dispersion solution according to claim 1, wherein
a content of the organic acid with respect to 100 parts by mass of the tin oxide particle is 0.10 to 2.00 parts by mass,
a content of the amine compound with respect to 100 parts by mass of the tin oxide particle is 0.25 to 1.00 parts by mass, and
a content of the phosphorus compound with respect to 100 parts by mass of the tin oxide particle is 0.50 to 10.00 parts by mass.

5. The conductive dispersion solution according to claim 1, wherein
a molecular weight of the amine compound is 180 to 500, and the amine compound is at least one compound selected from the group consisting of secondary amines and tertiary amines represented by formula (1):

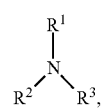

(1)

wherein, in the formula (1), $R^1$ and $R^2$ are each independently an aliphatic hydrocarbon group, and $R^3$ is a hydrogen atom or an aliphatic hydrocarbon group.

6. The conductive dispersion solution according to claim 1, wherein
a molecular weight of the phosphorus compound is 300 to 5,000, and the phosphorus compound is at least one compound selected from the group consisting of diesters and triesters represented by formula (2):

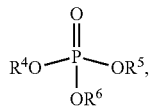

(2)

wherein, in formula (2), $R^4$ to $R^6$ are a hydrogen atom or an organic group, and at least two selected from the group consisting of $R^4$ to $R^6$ are an organic group.

7. The conductive dispersion solution according to claim 1, wherein the dispersion medium is an organic solvent.

8. A resin film-forming coating material comprising a resin, the coating material comprising
at least one selected from the group consisting of the resin and a precursor of the resin,
a tin oxide particle,
an organic acid,
a phosphorus compound, and
an amine compound, wherein
the tin oxide particle comprises an antimony-containing tin oxide particle A not treated with a silane coupling agent and an antimony-containing tin oxide particle B treated with a silane coupling agent.

9. The coating material according to claim 8, wherein the resin is a (meth)acrylic resin.

10. A resin film comprising a resin, wherein
the resin film is a cured product of a coating film of the coating material according to claim 8.

11. A member comprising a substrate and a resin film comprising a resin on a surface of the substrate, wherein
the resin film is a cured product of a coating film of the coating material according to claim 8.

12. The member according to claim 11, wherein the member is an electrophotographic belt having an endless belt shape.

13. An electrophotographic image forming apparatus comprising the member according to claim 12 as an intermediate transfer member.

* * * * *